(12) United States Patent  
Rizzolo

(10) Patent No.: US 12,260,447 B1
(45) Date of Patent: Mar. 25, 2025

(54) PLATFORM FOR PROVIDING MEALS IN A NETWORK OF DINING ENTITIES

(71) Applicant: Donato Rizzolo, Palm Beach Gardens, FL (US)

(72) Inventor: Donato Rizzolo, Palm Beach Gardens, FL (US)

(*) Notice: Subject to any disclaimer, the term of this patent is extended or adjusted under 35 U.S.C. 154(b) by 250 days.

(21) Appl. No.: 17/963,422

(22) Filed: Oct. 11, 2022

Related U.S. Application Data

(60) Provisional application No. 63/262,425, filed on Oct. 12, 2021.

(51) Int. Cl.
*G06Q 30/00* (2023.01)
*G06Q 30/0601* (2023.01)
*G06Q 50/12* (2012.01)

(52) U.S. Cl.
CPC ..... *G06Q 30/0635* (2013.01); *G06Q 30/0641* (2013.01); *G06Q 50/12* (2013.01)

(58) Field of Classification Search
CPC .......... G06Q 30/0635; G06Q 30/0641; G06Q 50/12
USPC .......................................................... 705/15
See application file for complete search history.

(56) References Cited

U.S. PATENT DOCUMENTS

| 2003/0093321 A1* | 5/2003 | Bodmer | G06Q 30/0633 705/26.8 |
| 2013/0197949 A1* | 8/2013 | Dermer | G06Q 10/02 705/5 |
| 2020/0334628 A1* | 10/2020 | Goldberg | G06Q 30/0633 |

FOREIGN PATENT DOCUMENTS

| WO | WO-0143021 A2 * | 6/2001 | G06Q 10/087 |
| WO | WO-2008057988 A2 * | 5/2008 | G06K 9/00369 |
| WO | WO-2016191333 A1 * | 12/2016 | G06Q 30/0224 |

* cited by examiner

*Primary Examiner* — Russell S Glass
(74) *Attorney, Agent, or Firm* — K&L Gates LLP

(57) ABSTRACT

A platform for providing meals in a network of dining entities via identifying a user type for a given user in an application platform for a plurality of users, selected as a given type providing in different instances of the application platform different subsets of user interfaces based on the given type of user with different abilities to interact with different types of other users and in response to receiving a command from the given user for performing an action in the application platform, providing an output of the action to at least one user of the recipient users via a second instance of the application platform.

20 Claims, 17 Drawing Sheets

PLATFORM FOR PROVIDING MEALS IN A NETWORK OF DINING ENTITIES

CROSS-REFERENCES TO RELATED APPLICATIONS

The present application claims the benefit and priority of U.S. Provisional Patent Application 63/262,425 filed on Oct. 12, 2021, which is incorporated herein by in its entirety.

BACKGROUND

The Social Trends of people eating out have started to shift from an older generation of consumers that ate out occasionally and for special events to a younger crowd of foodies and restaurant goers whose primary objective is to cater to their cravings, at the expense of their wallets. The younger generation is coming out of the schooling systems whether it be high school or college and are used to the idea of eating out or eating at dining halls. The notion of cooking your own food, grocery shopping for it and cleaning up after is starting to become more distant.

SUMMARY

The present disclosure provides an electronic platform that deals in meals plans. Herein "system" can be used to designate an electronic platform for carrying out the functionality as described. Through relationships with Big Food brands as well as local and small business restaurants the system is able to establish a wide network of participating restaurants that may accept system currency as a form of payment when dining at or ordering from their establishment. The system allows users to budget the costs of their meal plans/eating budgets on a monthly level. It enables people to escape the dreads of cooking, cleaning & grocery shopping and allows them to eat out for their meals without breaking the bank, the system makes eating out daily financially possible enabling its users to control what they want to eat and when without the financial guilt. The system also empowers small business restaurants and local eateries by providing tools to help them grow and scale their businesses.

One embodiment of the present disclosure a method that includes identifying a user type for a given user in an application platform for a plurality of users, selected from the group comprising: a supplier-type user; a consumer-type user; and a vendor-type user; providing in a first instance of the application platform one of a first subset of user interfaces, a second subset of user interfaces, and a third subset of user interfaces to the given user based on the identified user type, wherein: when the given user is identified as the supplier-type user, the first subset of user interfaces is provided for interacting with other users the application platform as recipient users, including the consumer-type user and the vendor-type user; when the given user is identified as the consumer-type user, the second subset of user interfaces, different from the first subset of user interfaces, is provided for interacting with other users the application platform as the recipient users, including the supplier-type user and excluding the vendor-type user; when the given user is identified as the vendor-type user, the third subset of user interfaces, different from the first subset and the second subset of user interfaces, is provided for interacting with other users the application platform as the recipient users, including the supplier-type user and excluding the consumer-type user; and in response to receiving a command from the given user for performing an action in the application platform, providing an output of the action to at least one user of the recipient users via a second instance of the application platform.

One embodiment of the present disclosure is a system, comprising: a processor; and a memory including instructions that when executed by the processor enable performance of operations including: identifying a user type for a given user in an application platform for a plurality of users, selected from the group comprising: a supplier-type user; a consumer-type user; and a vendor-type user; providing in a first instance of the application platform one of a first subset of user interfaces, a second subset of user interfaces, and a third subset of user interfaces to the given user based on the identified user type, wherein: when the given user is identified as the supplier-type user, the first subset of user interfaces is provided for interacting with other users the application platform as recipient users, including the consumer-type user and the vendor-type user; when the given user is identified as the consumer-type user, the second subset of user interfaces, different from the first subset of user interfaces, is provided for interacting with other users the application platform as the recipient users, including the supplier-type user and excluding the vendor-type user; when the given user is identified as the vendor-type user, the third subset of user interfaces, different from the first subset and the second subset of user interfaces, is provided for interacting with other users the application platform as the recipient users, including the supplier-type user and excluding the consumer-type user; and in response to receiving a command from the given user for performing an action in the application platform, providing an output of the action to at least one user of the recipient users via a second instance of the application platform.

BRIEF DESCRIPTION OF THE DRAWINGS

The accompanying figures depict various elements of the one or more embodiments of the present disclosure, and are not considered limiting of the scope of the present disclosure.

In the Figures, some elements may be shown not to scale with other elements so as to more clearly show the details. Additionally, like reference numbers are used, where possible, to indicate like elements throughout the several Figures.

It is contemplated that elements and features of one embodiment may be beneficially incorporated in the other embodiments without further recitation or illustration. For example, as the Figures may show alternative views and time periods, various elements shown in a first Figure may be omitted from the illustration shown in a corresponding second Figure without disclaiming the inclusion of those elements in the embodiments illustrated or discussed in relation to the second Figure.

Figure 1:
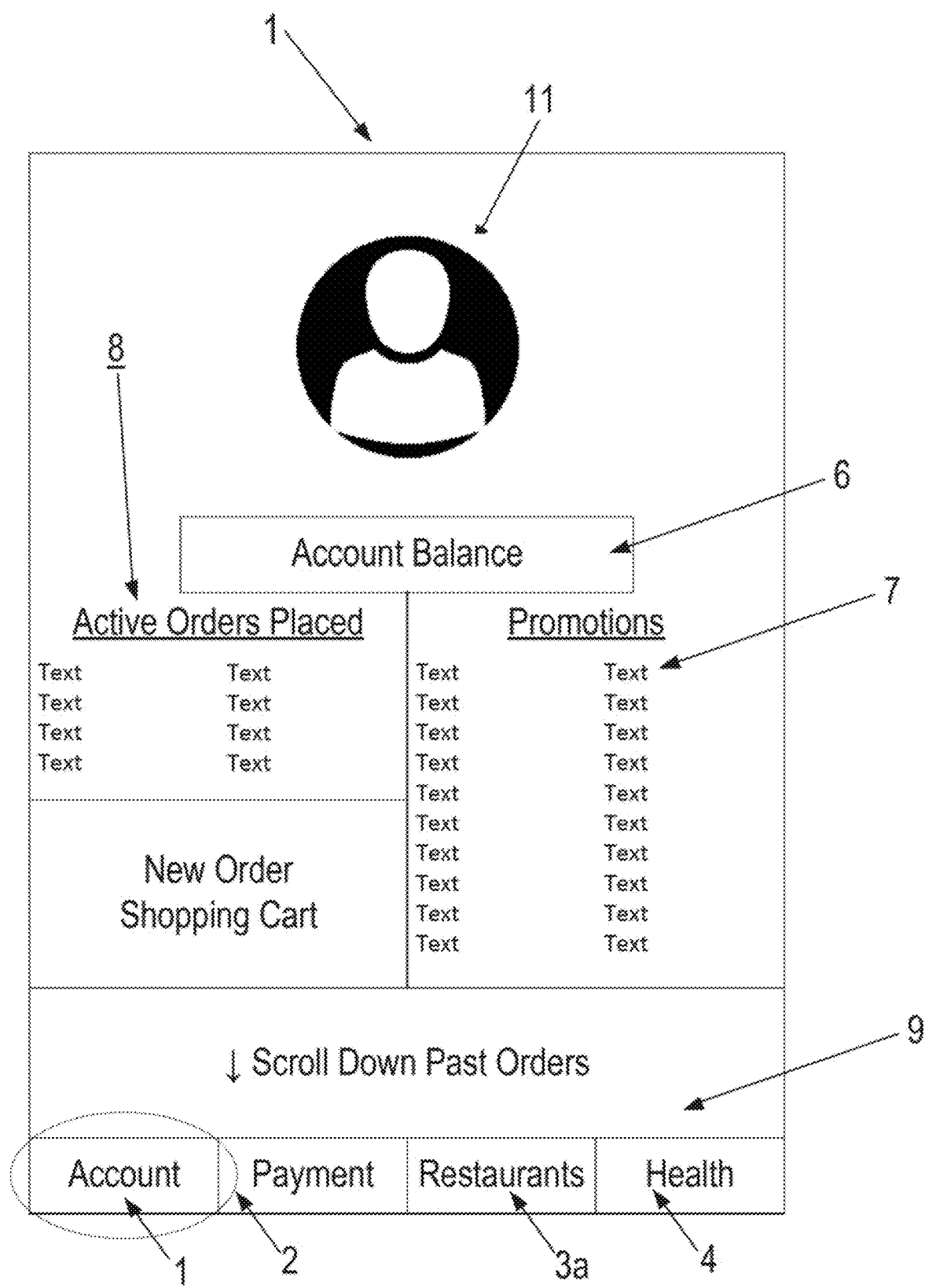

FIG. 1 illustrates an example user interface for an account screen of a platform for providing meals in a network of dining entities, according to embodiments of the present disclosure.

Figure 2:
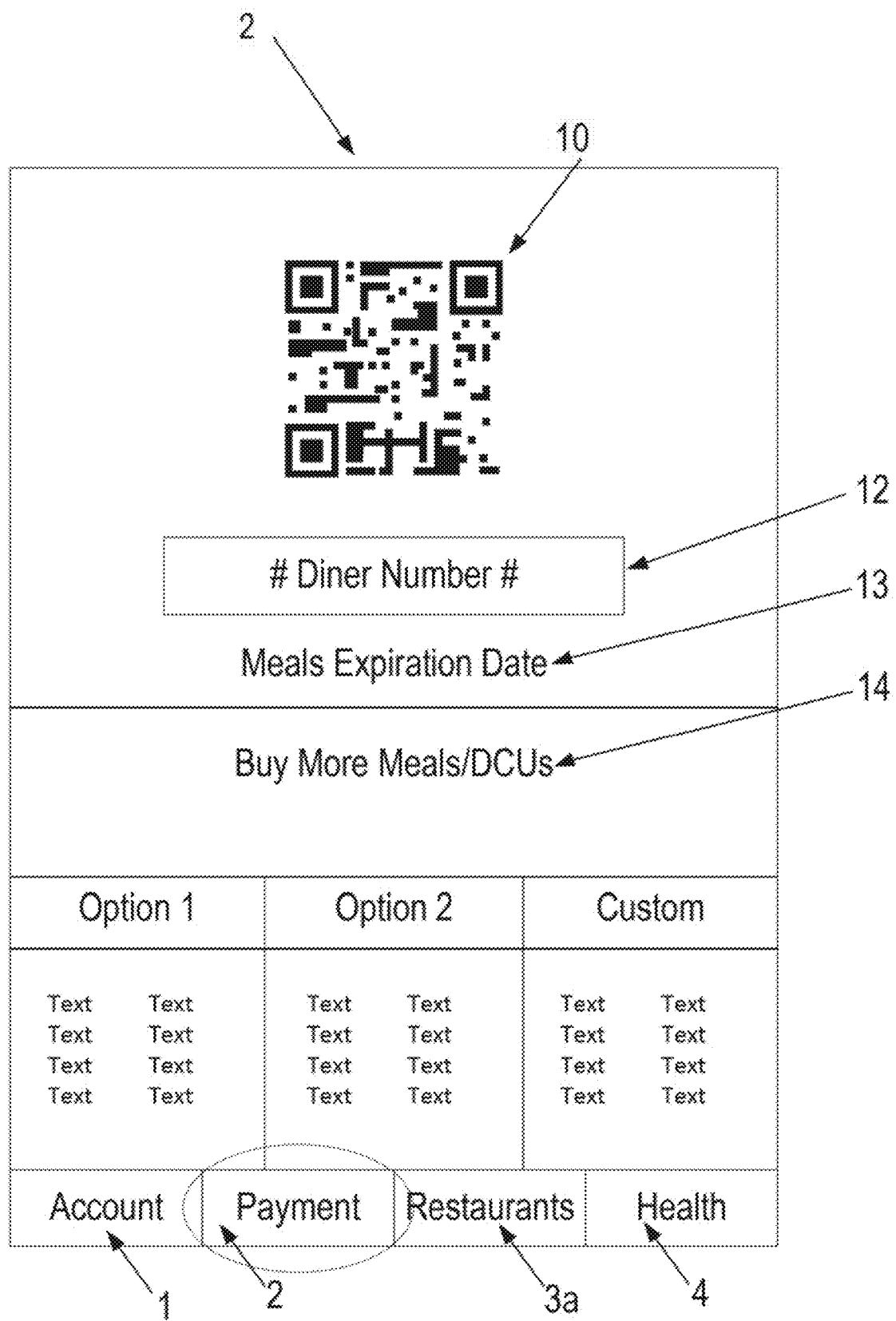

FIG. 2 illustrates an example user interface for a payment screen of a platform for providing meals in a network of dining entities, according to embodiments of the present disclosure.

Figure 3:
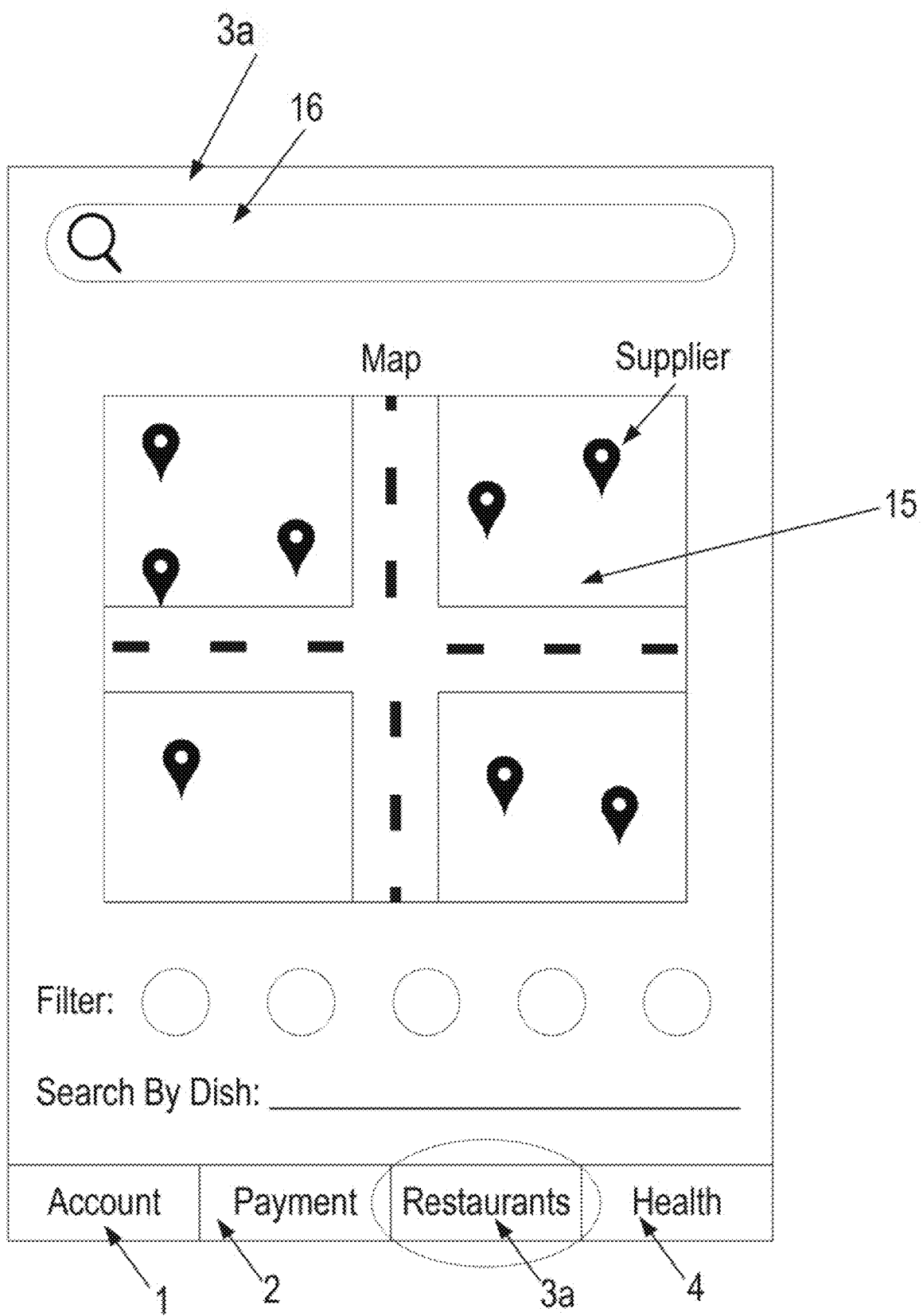

FIG. 3 illustrates an example user interface for a restaurant screen of a platform for providing meals in a network of dining entities, according to embodiments of the present disclosure.

Figure 4:
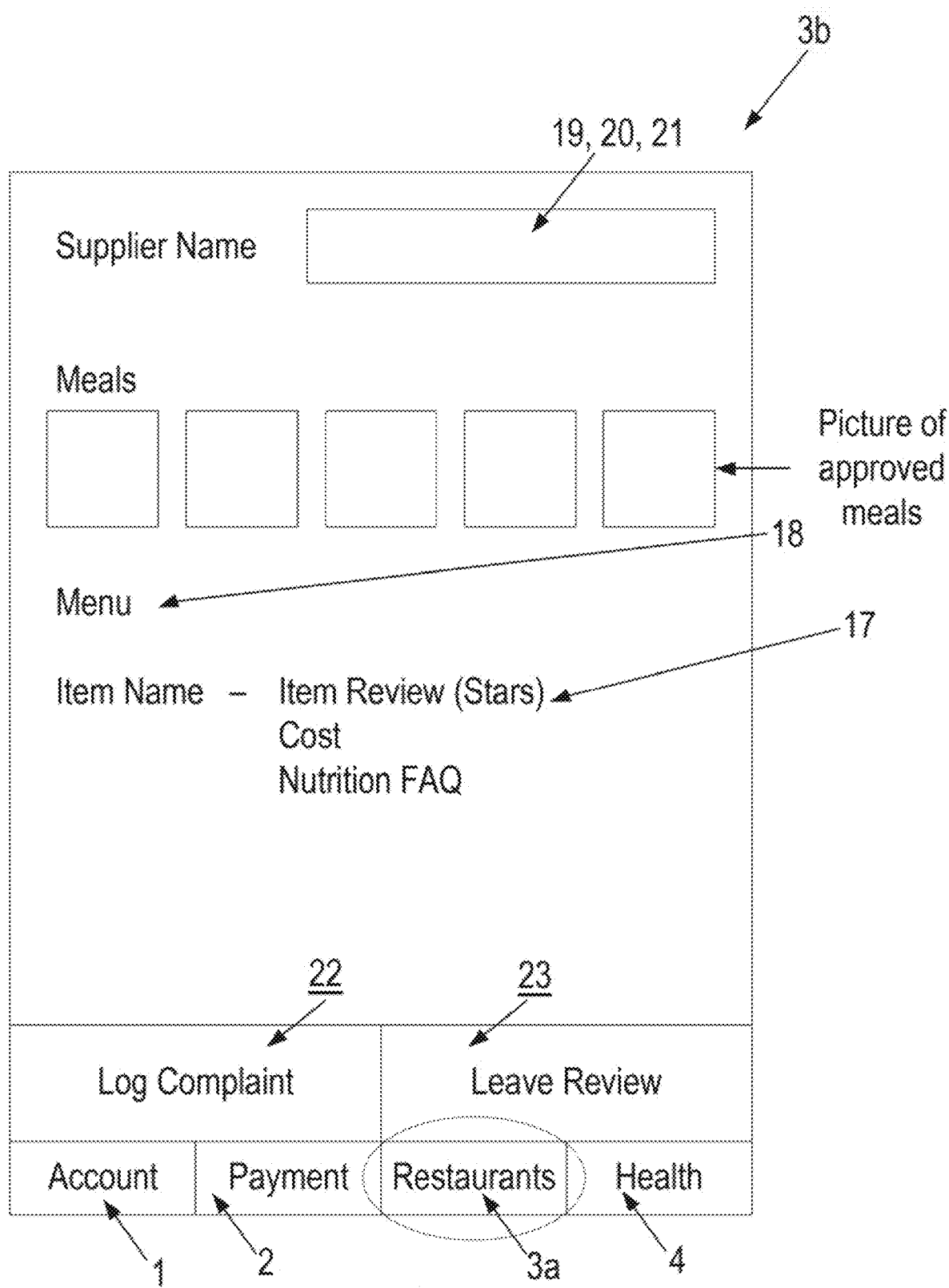

FIG. 4 illustrates an example user interface for a restaurant page/supplier of a platform for providing meals in a network of dining entities, according to embodiments of the present disclosure.

Figure 5:
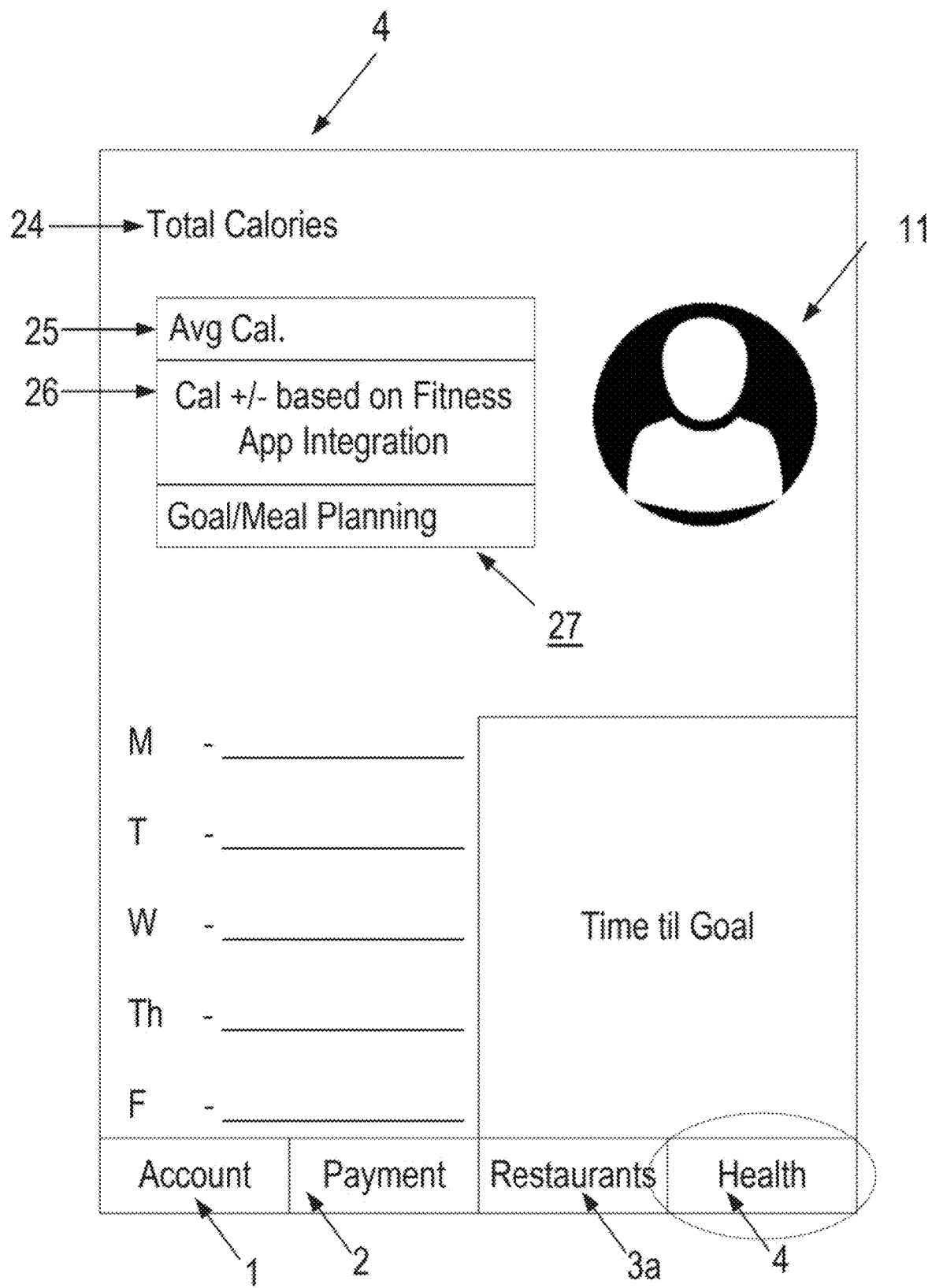

FIG. 5 illustrates an example user interface for health screen of a platform for providing meals in a network of dining entities, according to embodiments of the present disclosure.

Figure 6:
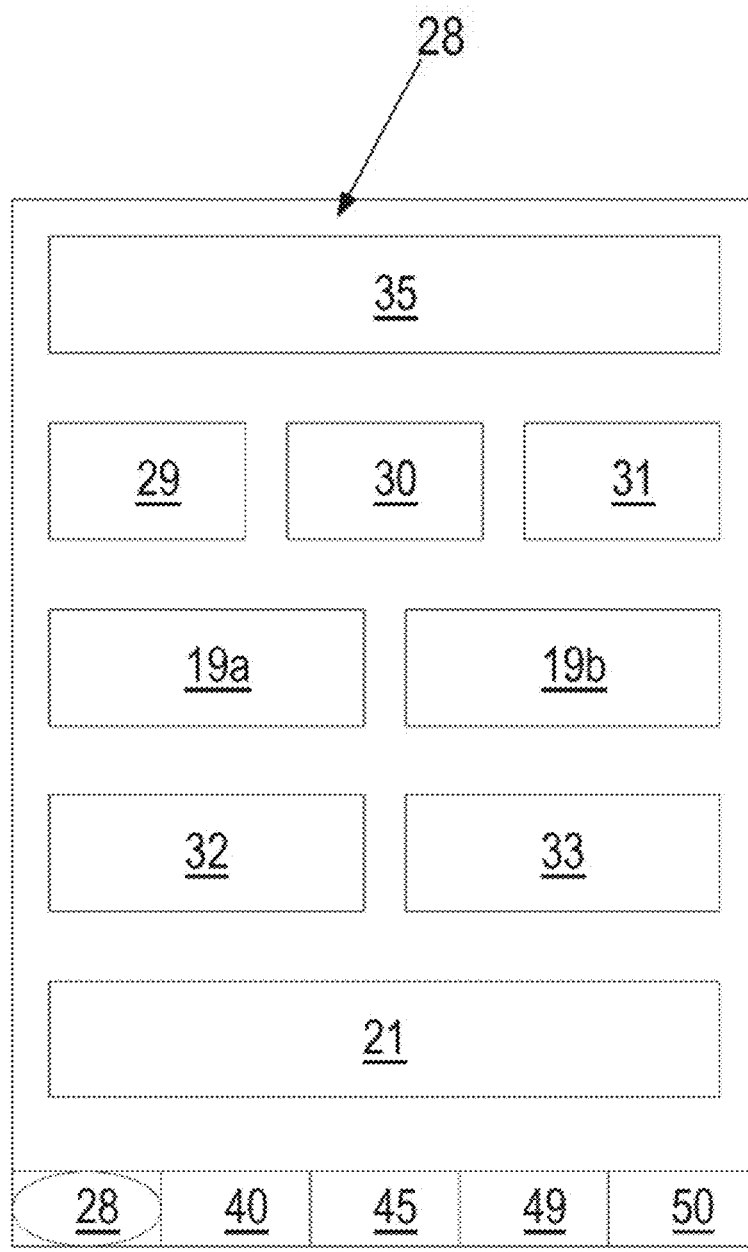

FIG. 6 illustrates an example user interface for account summary of a platform for providing meals in a network of dining entities, according to embodiments of the present disclosure.

Figure 7:
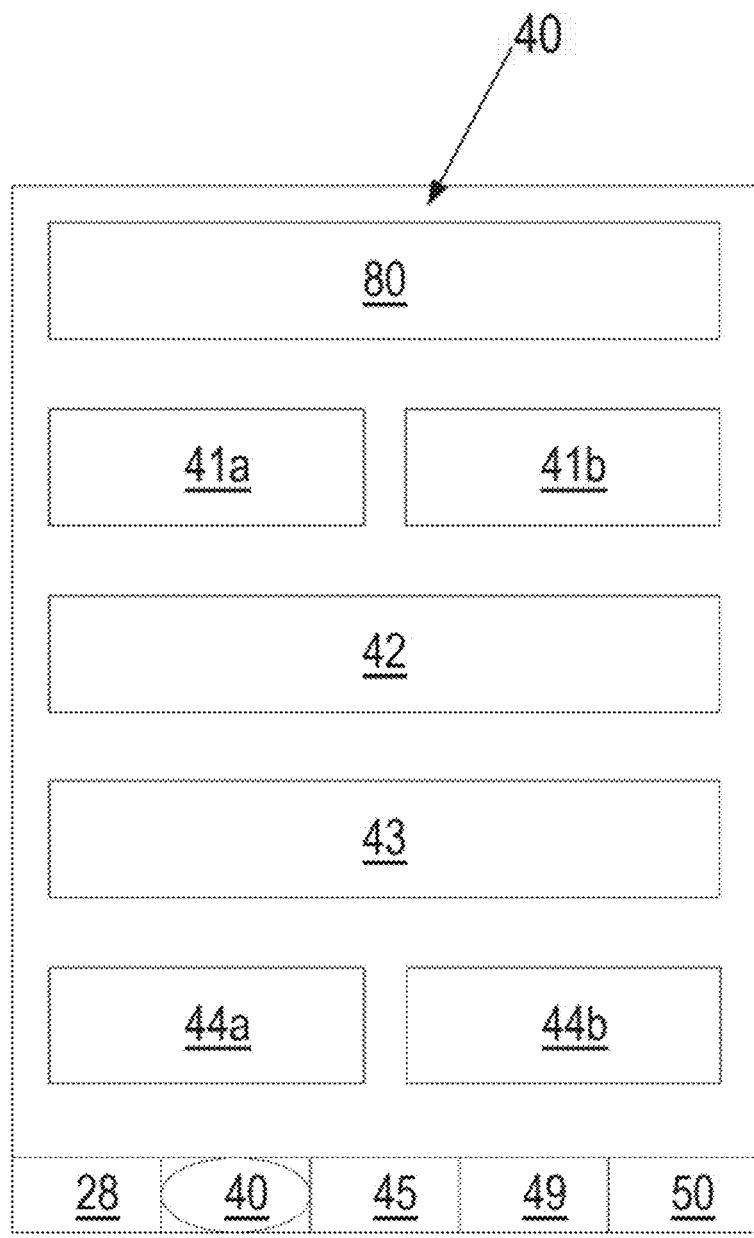

FIG. 7 illustrates an example user interface for restaurant health of a platform for providing meals in a network of dining entities, according to embodiments of the present disclosure.

Figure 8:
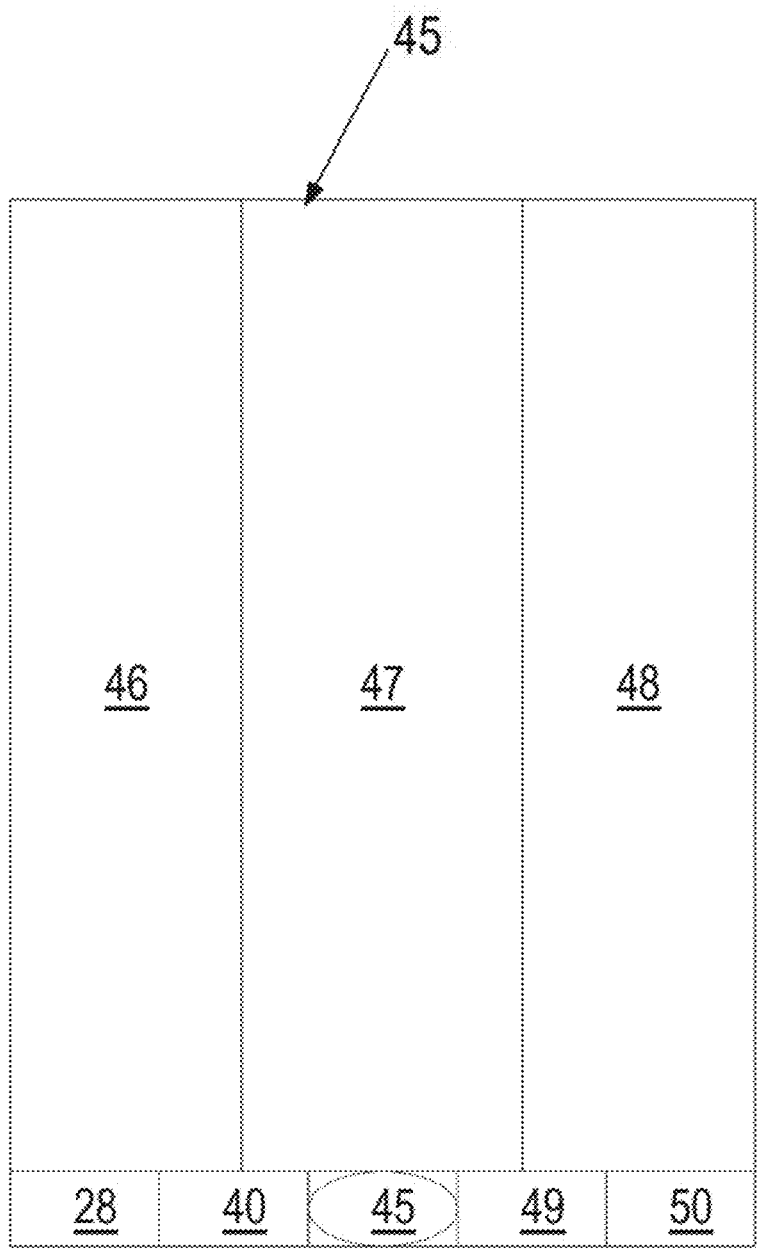

FIG. 8 illustrates an example user interface for advertising promotion of a platform for providing meals in a network of dining entities, according to embodiments of the present disclosure.

Figure 9:
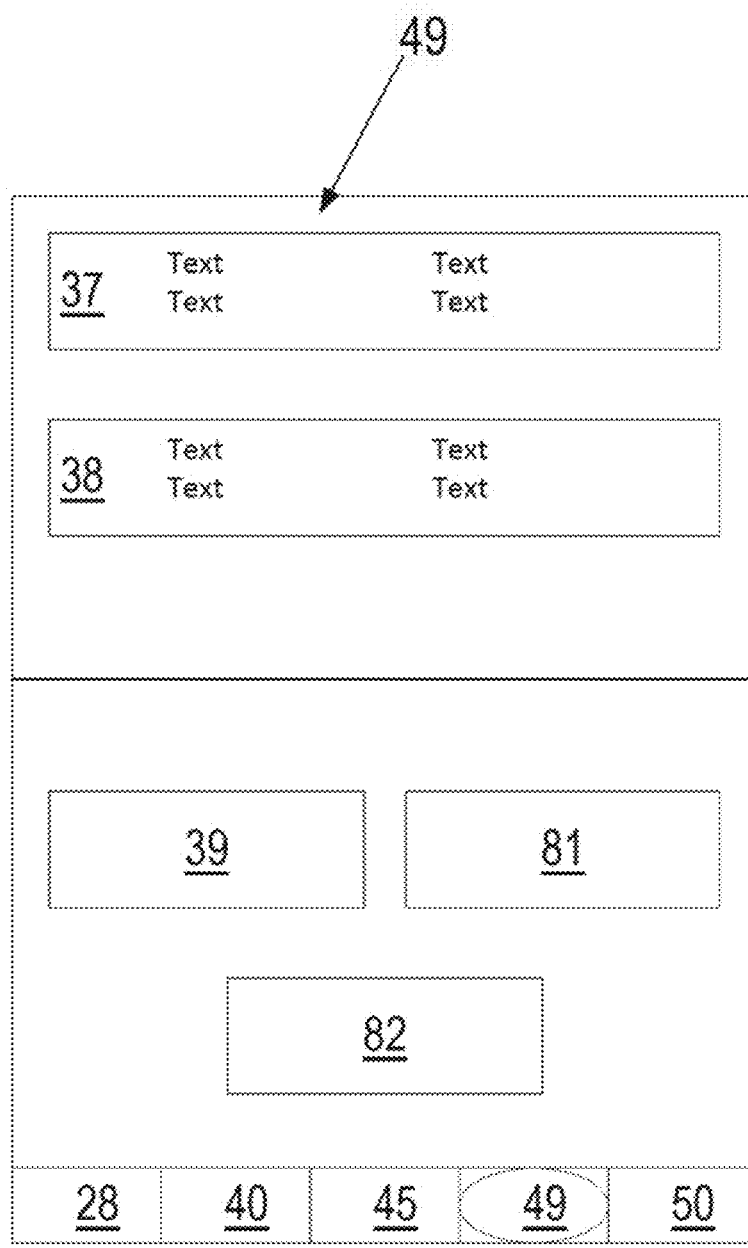

FIG. 9 illustrates an example user interface for a delivery driver of a platform for providing meals in a network of dining entities, according to embodiments of the present disclosure.

Figure 10:
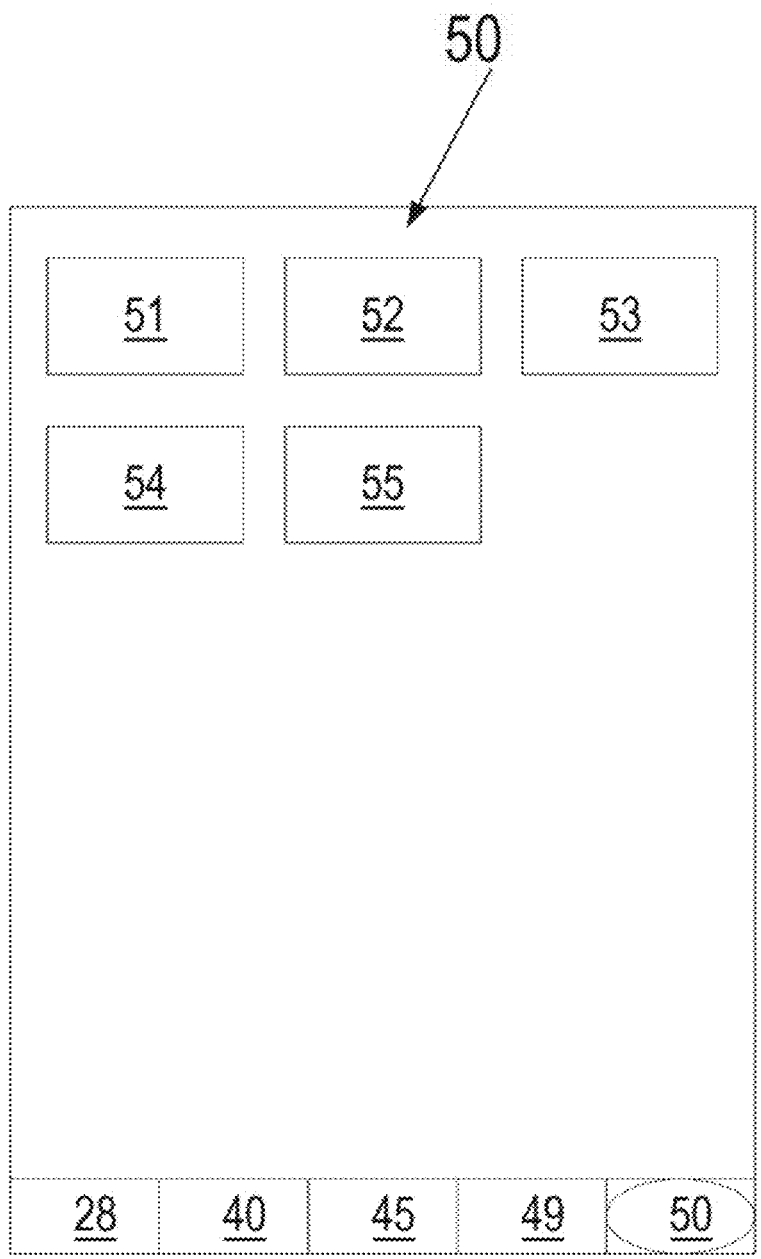

FIG. 10 illustrates an example user interface for a marketplace of a platform for providing meals in a network of dining entities, according to embodiments of the present disclosure.

Figure 11:
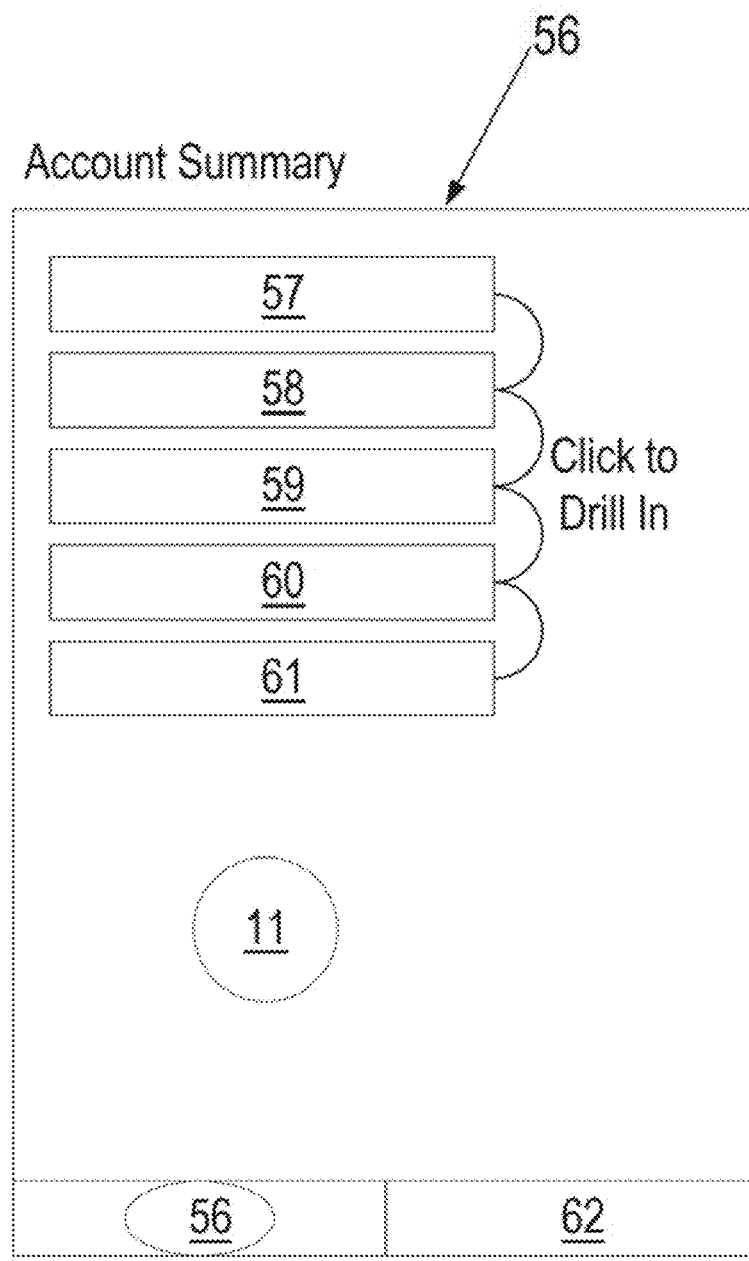

FIG. 11 illustrates an example user interface for a non-supplier monetizer for a platform for providing meals in a network of dining entities, according to embodiments of the present disclosure.

Figure 12:
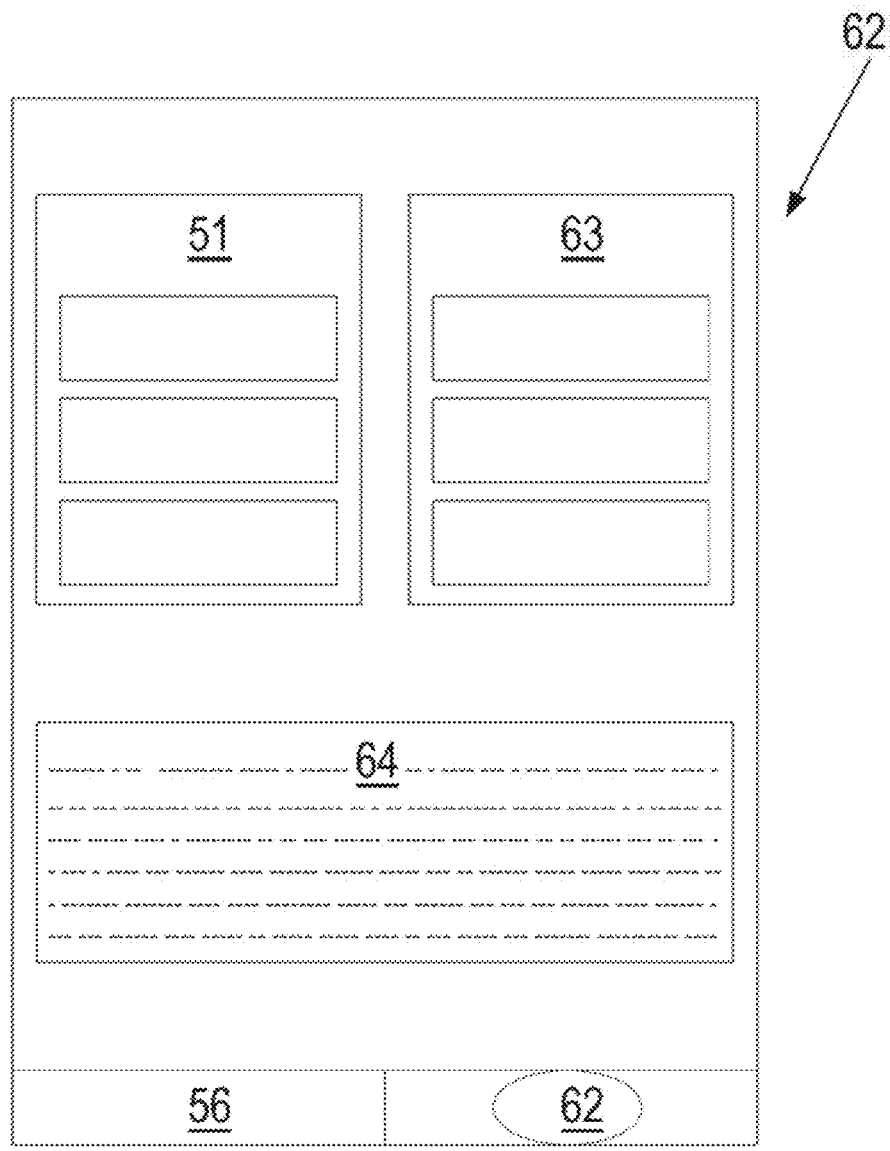

FIG. 12 illustrates an example user interface for a market place of a platform for providing meals in a network of dining entities, according to embodiments of the present disclosure.

Figure 13:
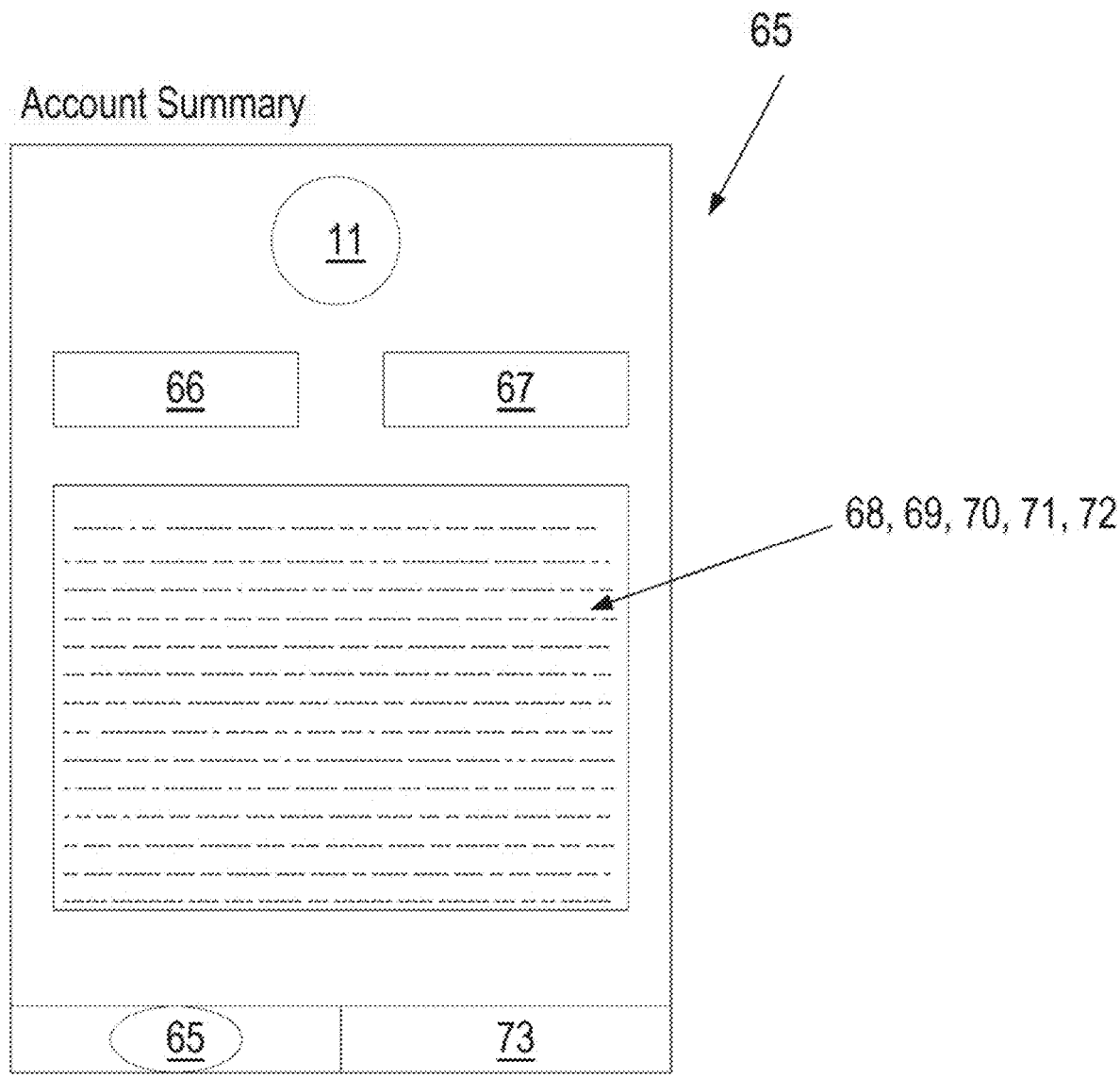

FIG. 13 illustrates an example user interface for chef/kitchen staff of a platform for providing meals in a network of dining entities, according to embodiments of the present disclosure.

Figure 14:
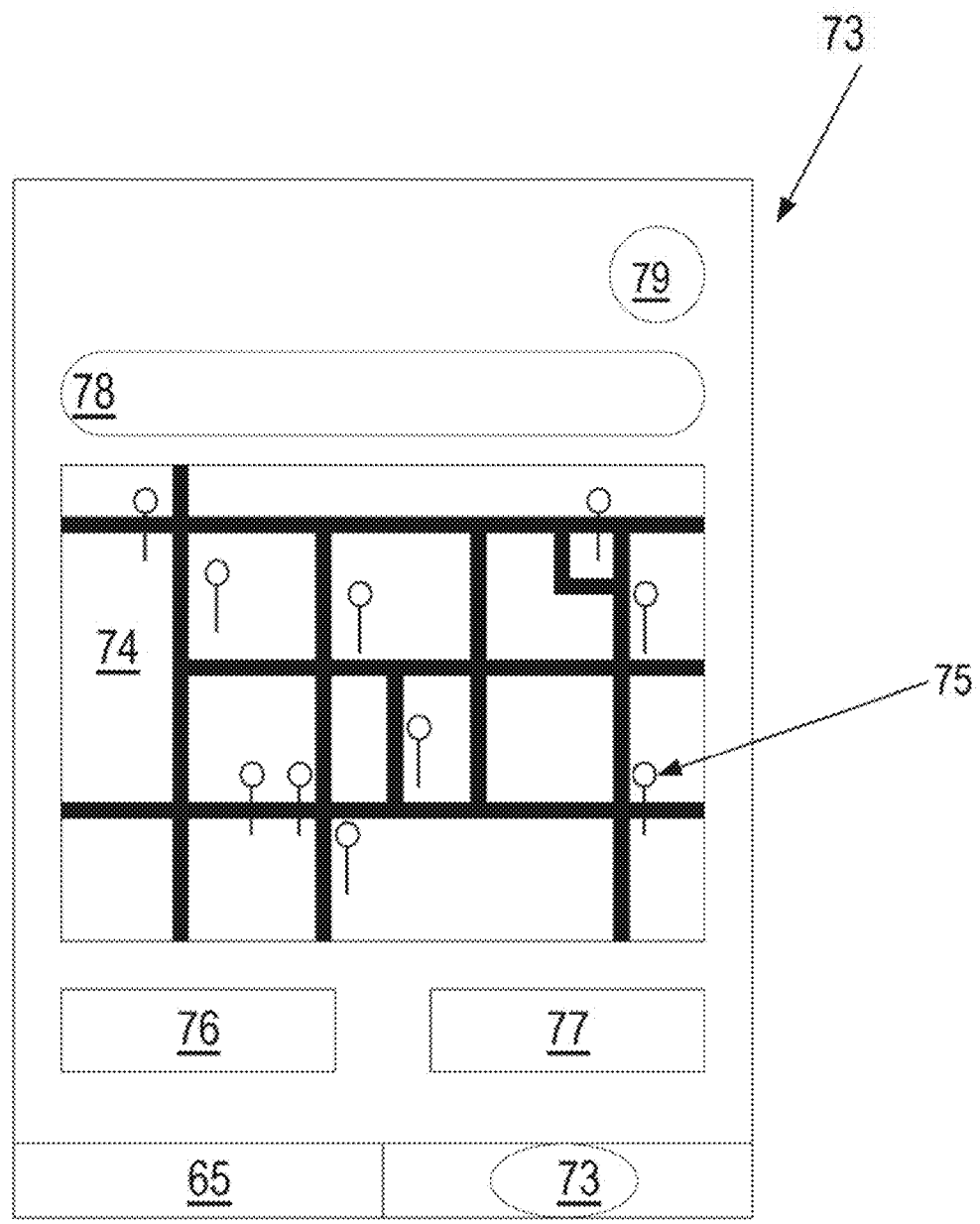

FIG. 14 illustrates an example user interface for a market place of a platform for providing meals in a network of dining entities, according to embodiments of the present disclosure.

Figure 15:
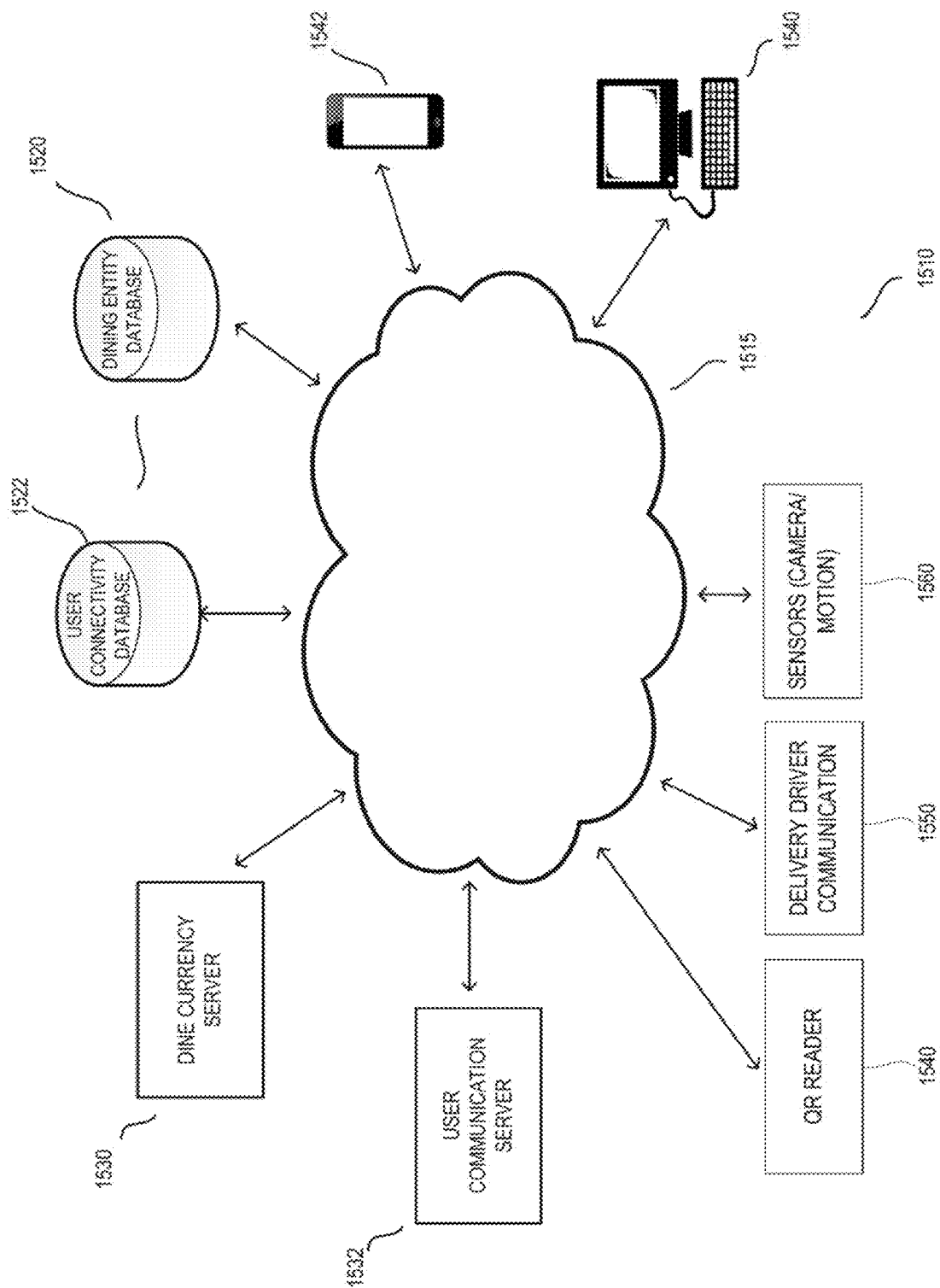

FIG. 15 illustrates a computing environment for assisting with providing a platform for providing meals using digital currency in a network of dining entities, according to embodiments of the present disclosure.

Figure 16:
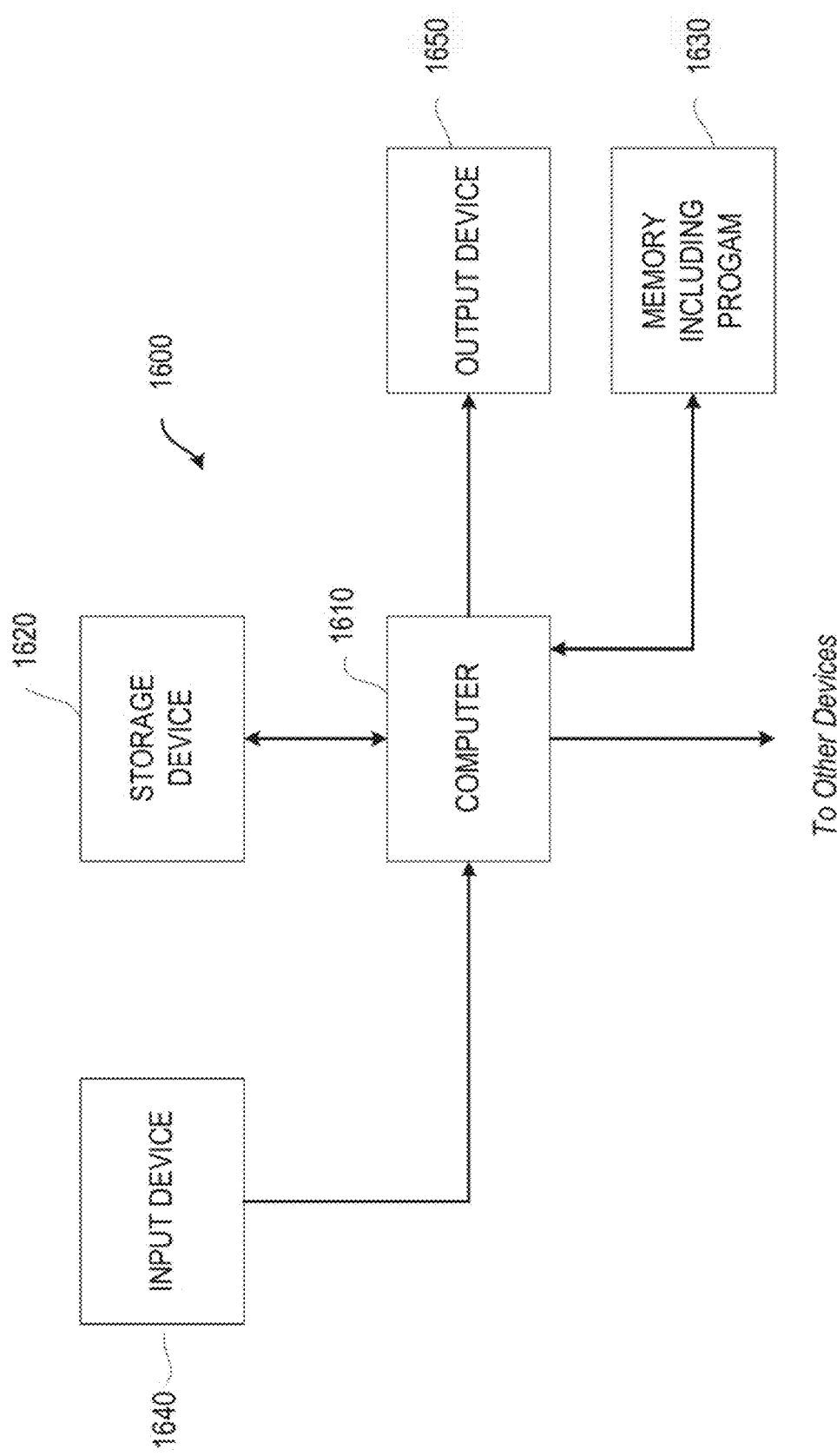

FIG. 16 illustrates a computer system for implementing a system and method, according to embodiments of the present disclosure.

Figure 17:
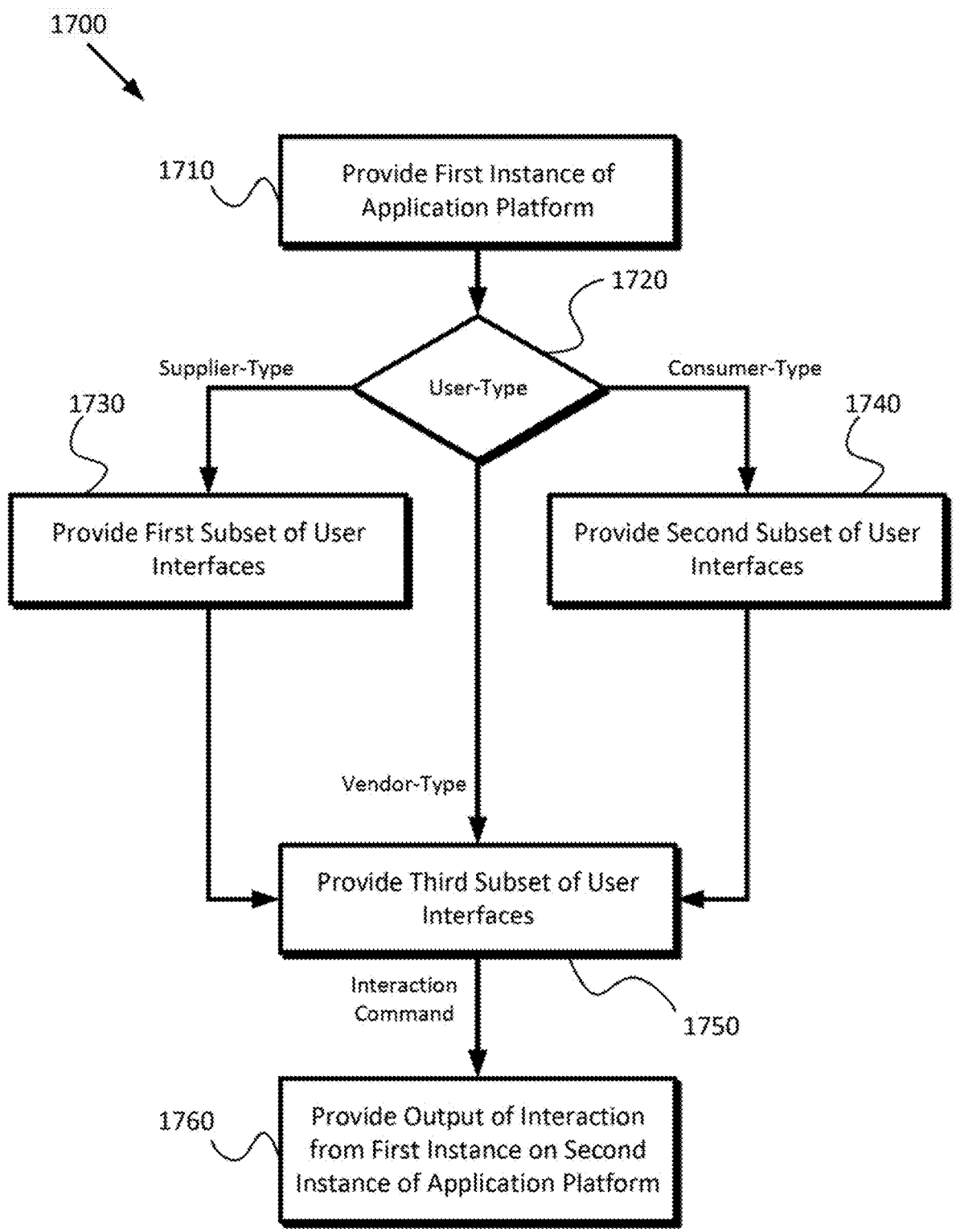

FIG. 17 is a flowchart of an example method of operating a platform for providing meals in a network of dining entities, according to embodiments of the present disclosure.

DETAILED DESCRIPTION

The present disclosure provides an electronic platform that deals in meals plans. Herein "system" can be used to designate an electronic platform for carrying out the functionality as described. Through relationships with Big Food brands as well as local and small business restaurants the system is able to establish a wide network of participating restaurants that may accept system currency as a form of payment when dining at or ordering from their establishment. The system allows users to budget the costs of their meal plans/eating budgets on a monthly level. It enables people to escape the dreads of cooking, cleaning & grocery shopping and allows them to eat out for their meals without breaking the bank, the system makes eating out daily financially possible enabling its users to control what they want to eat and when without the financial guilt. The system also empowers small business restaurants and local eateries by providing tools to help them grow and scale their businesses.

The system may have multiple revenue streams. Below are the highlighted ones:

i. Subscriptions

The system may have a subscription cost as the base cost to join the system Membership. Users can access the app for free, and these users may be called "Diners" and can make a free account to view local reviews and dining spots, they can even purchase a dining meal plan but may not receive discounted pricing compared with a user who has a paid membership with the system. These users may be called "Premium Diners". Purchasing a paid subscription may give you access to becoming a Premium Diner, and this may allow you to purchase meal plans and additional meals and/or Dining currency at a discounted rate. Below are found improvements to existing systems such as similar to an Amazon Prime membership or an Uber Eats pass, or a Dash pass. Subscriptions may be based on a yearly period.

ii. Selling Meal Plans

Once a user has purchased the system Membership and becomes a paid "Premium Diner", they may have access to meal plan purchasing at discounted rates. Please note "Diners" can also purchase these same meal plans but they are not discounted. A meal plan consists of a set number of "meals" and/or a set number of "meals" along with a set number of "dine currency units". The users may have the ability to review the set meal plans and even build their own custom meal plan. Meal plans are based on monthly calendar cycles and reset every calendar month. Users may purchase their desired combination of meals and/or dine currency units and may pay in advance, either monthly, or weekly. Users may have the ability to upgrade their meal plans at any time during the month to a higher package, or can purchase additional meals/dine currency units individually if they do not want to upgrade their existing meal plan. The system may have pre-established rates with each supplier (food vendor) in its network. In an improvement to a Groupon type of arrangement the vendors may establish their bottom-line cost and what cost above their bottom line they may be willing to accept as generic pricing on their food items, where they are able to turn a profit, but there is still a margin for the system to make a profit, while still offering a cheaper price to the end user than if they came in and ordered the item from the menu and paid cash/credit directly to the vendor and did not utilize the system. This may incentivize end users to purchase their meals through the system as they may be essentially prepaying for their future restaurant meals at a discounted price. Menu Options that are approved by the system and vendor may be clearly marked as well as premium meal option that require a meal voucher as well as some additional cost which is paid in "Dine currency Units". Dine currency Units are digital dollars that hold no physical value except when used with the system approved vendors. The system may pre-establish rates with vendors as to allow end users of the system the option of buying additional meal dollars (dine currency units) from them at a discounted rate, for example the system may negotiate a 1:2 rate with the vendor where every system digital currency unit spent at their restaurant gets paid out to them at a rate of fifty cents on the dollar. This may allow restaurants to still obtain their bottom line plus a profit margin on their premium items while allowing the system to sell "Dine currency units" to its users at cheaper than "USD Dollar" rates they would get with cash (Example 200 Dine currency units can come with a package that costs less than $200 USD/Month to purchase). All meals approved through the system may be identical to the meal sold to a non-system dine user.

iii. Selling Additional Meals/Dine Currency Units

The system in addition to selling the meal plans that contain meal vouchers and/or a dine currency unit combination may also be selling individual meals/dine currency units (DCUs). Users that are diners and users that are premium diners can purchase individual meals or dine currency units for a set flat rate, the only difference being that premium diners would receive the discounted meal/dine dollar pricing whereas diners would not receive the discount. Meals and Dine currency units have flat fees and are easily manageable in an end user's budgeting, and meals can be redeemed at any system-approved vendor (restaurant). Each additional meal/dine dollar sold may generate a direct profit for the system as the system may make their markup cost/margin on the meal once the user redeems the meal at an approved location. If the user does not redeem the meal or lets it expire the system may profit even more than the original projected margin.

iv. Delivery Service

The system may offer delivery options, which may include allowing drivers to register as delivery drivers for the system, and it may also allow other companies that already offer meal delivery and delivery services to register as suppliers with the system and supply drivers to the system. Users would pay an additional monthly fee on top of their meal plan which may allow them free delivery on their meals. There may be restrictions for the number of deliveries per day based on the package selected. This is to avoid users purchasing ten meals in one day separately all for delivery. Unless the user purchases the unlimited delivery package, they may be restricted to a set number of deliveries per day. In this scenario the system would profit by paying a direct wage to delivery drivers if the system is not partnered with another company that already has the registered drivers. This direct wage would be consistent with other similar delivery services but may also allow vendors to register their delivery drivers to accept deliveries for the system's users who order from their restaurant. Through their registration with the system, any order placed through the app at their restaurant for delivery would first be offered to them to fulfil the delivery; if they reject the delivery, it may then be offered to any registered delivery driver in the system, in the area. If the restaurant accepts the delivery, they can have their own delivery driver (this driver would be vetted the same way any other registered delivery driver for the system would be vetted, except they may not be a direct employee of the system) perform the delivery and the restaurant may be reimbursed the same fee an independent delivery driver for the system would be paid. This would also allow vendors to monetize their delivery staff as most industry standards show restaurants with their own delivery service are normally offering the delivery option at no additional cost or are setting an order minimum; regardless it's an expense the restaurants are currently absorbing, with the delivery option through the system, restaurants may get reimbursed monthly for all the deliveries they have performed. This can offset their existing delivery expense or potentially earn them an income source. Additionally, this may indirectly benefit delivery drivers as this is a high turnover job position as the income is not steady or the job security is not stable; when restaurants start to see delivery services as a valuable amenity to provide, they may stabilize the market and offer better wages as they too may indirectly be competing with the money a Delivery Only driver for the system can earn. The system can assist its suppliers in determining the profitability and expenses of adding the delivery service to their business. The system may track user data and restaurants data and may be able to provide a report and summary of all orders placed and paid with a system meal voucher at the restaurants and if they requested delivery or not, as well as how many users in the area have delivery enabled subscriptions, allowing the restaurants inside data. Restaurants can potentially purchase the system's advertising to reach users and offer them a promotion for using delivery at their restaurant if the data is favorable. This may create an environment of higher customer service in the food industry and more restaurants may eventually offer free delivery for orders purchased at their restaurant that are not being paid with a system meal plan, thus gaining them more business of non-systems customers. This may stay in an equilibrium because it may still be "cheaper" cost for a person to use a meal plan with delivery than to purchase the meal with free delivery from the restaurant and pay the full meal price in cash or credit. The suppliers' contract may require the systems meal reimbursement cost to be lower than the cash or credit pricing a non-system user would be paying. In essence the delivery service should provide more stability for independent delivery drivers, delivery drivers employed by restaurants and to restaurants while ultimately providing a better food experience for all end users of the food industry whether they are system users or non-system users.

v. Advertising Fees

The system may profit off of advertising fees that it can charge to vendors who would like to run a promotion or special to attract customers. Many customers know of their favorite spots to eat, but customers looking to eat at other restaurants may be using the system's App to locate restaurants in the area that are part of the system's network. the system's app may frequent many visitors and advertising your restaurant may produce prospective new customers. Advertising options can consist of promotional notification pushes to local users, in app banners and more.

vi. Credit Card Option

The system may offer a Credit card issued through a recognized bank. In an improvement to the United Mileage plus card or the Amazon Prime credit card, the system credit card may not only be tied to your account but it may spotlight the restaurant lovers that choose to eat at system approved locations as well as non-approved locations. The credit card may offer cash back and incentives specifically on dining related charges at non approved system locations (system approved locations won't carry a charge, and instead the meal may be deducted from your system meal plan). The system may profit through the transaction fees and credit card fees that are generated when the credit card is used. Additionally, users can use this credit card as a physical copy of their meal plan if they choose to not use the QR user code or their system Membership number.

vii. Possible Government Contracts

The system acknowledges there is a mutually beneficial relationship that can be established between the system and the government where the system can sell discounted plans to the government that can then be given to underprivileged qualifying families and individuals. Currently the federal government offers things like food stamps, and local governments in some areas are offering other incentives to help subsidize the cost of food for people who qualify. The system can offer a similar benefit with much more beneficial tools and much less negative draw backs. The system may also be able to provide a much more in-depth analysis of user information on users receiving the meal plans.

viii. The System Market Place

The system's Market Place may be a built in Market Place on the system Platform and App. Users may be able to browse a wide variety of services, staffing options, Retail spaces, Kitchen Spaces, and Licensed Meals and more, all earning revenue for the system.

1. Staffing Chefs/Kitchen Workers

The system may earn revenue from its staffing platform. Users can sign up within the system as Chefs and other types of kitchen employees and can enter the Staffing Market place where their profiles can be viewed by all registered suppliers of system. This may allow suppliers to view resumes and work experiences, and hire new kitchen staff easily and reliably. Similar to any other staffing company, the system may earn revenue off of each employment contact established through the system Staffing Market Place. Both Suppliers and Chefs/Kitchen Workers may have the ability to filter prospective Chefs/Kitchen Workers or prospective employers (suppliers) when they post their listing if they would like to target a specific type of restaurant or a specific type of employee with who their listing reaches or if they would like to keep their listing from showing to a specific filtered criterion, both end users (Suppliers and Chef/Kitchen Workers) may have this option.

2. Facilitating School/Corporate/Sporting Event Kitchen Rental Agreements

The system may earn money with their Kitchen Rental Space Platform. Any supplier or monetizer on the system can list kitchen space for rent through the system App platform. Other Suppliers may be able to view the available kitchen spaces and place bids for them. The system may earn revenue for brokering these agreements as well as earn revenue from a percentage of the business/meals sold through the brokered space.

3. Licensed Meal Sales

The system may earn Revenue from all Licensed Meals sold to customers through the system Suppliers. The system may offer a service where suppliers can submit meals (recipes and process) for the system Licensing approval. If the ingredients and process are unique the system may "License" the meal for the supplier. The Supplier can then list the meals on the system Market Place. Other suppliers can bid and come to agreements, the system suppliers may earn a flat rate for each licensed meal sold by other suppliers they have an active agreement with, The system may also earn a flat Fee for each Licensed Meal Sold.

ix. Nutritionists Revenue Sharing: Similar to Licensed Meal Sales, nutritionists that are signed up as suppliers through the system Platform can earn revenue for their custom meal plans and meal advice they supply to the system Users. The system may share in the revenue generated from nutritionists.

1. What is the System?
c. Why the System Will Work
i. Social Trends

The Social Trends of people eating out have started to shift from an older generation of consumers that ate out occasionally and for special events to a younger crowd of foodies and restaurant goers whose primary objective is to cater to their cravings, at the expense of their wallets. The younger generation is coming out of the schooling systems whether it be high school or college and are used to the idea of eating out or eating at dining halls. The notion of cooking your own food, grocery shopping for it and cleaning up after is starting to become more distant. The system plays perfectly into this trend as it covers both crowds the older and younger crowds. It allows for budgeting of food expenses and allows the user to focus entirely on their schedule and what they want to accomplish in their day while allowing minimal time waste when it comes to deciding what you would like to eat, looking up the recipe, shopping for ingredients and cleaning up after. This may also avoid the additional expense of wasted food that arise from buying ingredients and not using them all while cooking. The system may also play into the health and fitness trend that is on the rise as it may make food tracking and monitoring an automated process that can provide the end user valuable data.

ii. Increasing Cost of Food

The system can address inflation. One factor that may contribute to the success of the system is the increasing cost of food and groceries. Since the pandemic started in early 2020 most groceries have risen in price with some having an estimated 30% increase in cost. The system allows the end user a buffer to these price changes as most restaurants as well as the system deal with Distributors and food on the bulk level; although they are affected by these price changes they are not as sensitive to them as the end user and are able to spread the price increase over a larger portion of food or purchase in bulk. For example, a commodity that an end user is purchasing from their grocery store increased in price to them but a meal from a restaurant that uses that same commodity as an ingredient was able to continue serving the meal without increasing their end user price. This may not guarantee a zero increase in price of food/meals over the years but may drastically reduce the impact of food price increase to the end user especially since the system is able to act as a buffer for times of increased inflation and CPI, for example all system contracts with vendors are yearly (or multiyear) based, rates paid to vendors can only be negotiated on a yearly basis which provides the end user a year lag before price changes/inflation can start to affect them (such as a meal plan costing more when the user renews it in a new year), additionally the system can provide a buffer to the end user as each year that prices increase the system has the option of lowering the system profit margin on each meal and absorbing the increased bottom line costs vendors are negotiating with on their contract renewals. So theoretically vendors can receive a higher payout when renegotiating their contracts with the system to account for inflation costs and the system takes a smaller margin so the system can still keep the same rates and prices for the meal packages they are selling. After a set amount of years of reducing margin to maintain same pricing the system can raise their prices and once again return to their original profit margins. This will stay in equilibrium as while prices are increasing due to inflation, the margin on each meal the system earns reduces. As this occurs there is an increase in appeal of how cheap the meal plans are priced compared to the price of the same meal purchased outside the system with cash or credit (as the cash/credit prices have been affected by the bottom-line cost increasing due to inflation). Since the appeal of how cheap the meal plans are price has increased, the system may see an increased amount of end users thus earning the system the same or more revenue even though the margins are lowered.

iii. Pandemic Effects

Another Factor that may increase the success of the system is the Pandemic of COVID-19 and its effects. Many restaurants have closed down and many are on the brink of closing down or collapsing. The restaurant business although a vital service is still not seeing the numbers it was previously seeing. This is partly due to the pandemic and partly due to the effects of the pandemic. Customers are no longer as willing to dine in or go out to restaurants even if it's to pick up food. Leaving the safety and convenience of their home has now more than ever become a nuisance, and people would much rather stay in and not expose themselves to the public. For the people who are still willing to go out, many of them are adversely affected; perhaps they were affected by losing a job or getting lower pay, and some people whose pay was not affected are affected by the increased pricing on goods and services as now their same salary cannot purchase the same amount. The system may bring the convenience back to food and eating based on your lifestyle and schedule. People may no longer depend on grocery shopping as their main source of meals/food. Additionally, regarding all the restaurant and food businesses that are struggling, the system may bring the customers and sales volume back and the cheaper meal pricing and easy to use app may incentivize more people to get out and start dining again.

2. How Does the System Work?

a. Meal Plans

Meals plans are the main service or good that the system sells. Meal plans consist of a combination of either meals or meals and Dine currency units. Meal plans are sold based on a monthly count of meals. Meal plans should reset at the end of each calendar month. Meal plans are paid for prior to being able to use the meal credits, and payments can be deducted at a custom payment schedule, weekly, biweekly or monthly. To an end user a meal holds the same value at all restaurants, and items on the menu that are marked as approved meals can be purchased with one meal credit (voucher). Premium menu options require a meal credit plus an 2. How Does the System Work?

a. Meal Plans

Meals plans are the main service or good that the system sells. Meal plans consist of a combination of either meals or meals and Dine currency units. Meal plans are sold based on a monthly count of meals. Meal plans should reset at the end of each calendar month. Meal plans are paid for prior to being able to use the meal credits, and payments can be deducted at a custom payment schedule, weekly, biweekly or monthly. To an end user a meal holds the same value at all restaurants, and items on the menu that are marked as approved meals can be purchased with one meal credit (voucher). Premium menu options require a meal credit plus an additional amount of Dine currency units. Premium menu items that are listed in dine currency units only may require payment in DCUs only, no meal voucher will be used.

b. Dine Currency Units

Dine currency units are digital currency that may hold no physical resale value. Dine currency units may be purchased through the system and are used to cover additional costs above one meal credit (voucher) when purchasing a premium meal item. Dine currency units may be cheaper than US currency as the system has an agreement with their approved vendors to accept the dine currency units and they may be reimbursed later on by the system for each DCU they receive. While the system acknowledges not all meals can cost the same it allows its approved vendors to preapprove premium meals so users of the system can still order a variety of foods on the menu while using their Meals and dine currency units as payment.

c. Flexible vs. Non-Flexible Meal Plans

At the end of each calendar month the meal plans can reset back to 0 meals used and the meal credits in your selected meal plan replenish. If you have unused meals at the end of the month these meals essentially expire on a non-Flexible meal plan. On a Flexible meal plan a percentage of your meals and Dine currency units may carry over to the next month. Flexible meal plans are identical in all other aspects to non-Flexible meal plans with the exception of the carry-over of meals/dine dollars. Because of this carry over benefit, Flexible meal plans are slightly more expensive compared to non-flexible meal plans. At any time during the month or prior to the first of the following month users can "Donate" meals to their local Food Banks/Charities rather than allowing them to expire at months end. Each local food bank will be an approved qualified charity food bank. This may allow the system users to receive a tax-deductible write-off that the system may calculate and provide the users at years end for tax filing purposes.

d. Meal Donation to Charities

As mentioned above anytime during the month a user can decide to donate any number of their meals. Meals may be donated to a Local food bank/charity; if there is more than one approved food bank or charity in the local geographical area the end user who is donating their meal(s) may get the option to select the charity they want to donate to. Once the month concludes the system may calculate the total number of donated meals in that geographical location. The system may then award the meal contracts to suppliers who win the meal contracts based on predetermined criteria. Suppliers can win contacts a number of ways, some based off of advertising spending in that month, some based off of end user reviews and feedback and other categories such as being a local or small business supplier in the geographical area. The total number of meals may be divided into equal number of meals per week that may be distributed during the next month. During the next month the system may distribute the contracts weekly to the winners and the winners may be required to create the numbers of meals they are awarded. Meals may be packaged in To-Go containers and may be required to have a shelf life of 7 days (1 week); once the meals are prepared the system may deliver them to the charities and the supplier may get paid per meal created. All the spending costs to create the meals may be tracked and provided back to the end users in an organized fashion at years end so the end users may submit the tax-deductible donations when submitting their taxes. This goes back to the system's ideology that by providing the meal plans the system is supporting the environment and eliminating an immense amount of food waste. We see food waste being a common thing in present times where customers purchase bulk amounts of food from grocery stores to take advantage of the cheaper pricing only to allow the food to go bad as they cannot consume it all before the food expires. The donation feature of the system may eliminate this as there won't be as much food waste from buying bulk food; instead there may be meal excess of non-consumed meals on meal plans which may then get donated back to the local charities to support local community individuals that require assistance while providing the end user a tax deductible credit at years end, essentially providing them a "refund" for excess food versus wasting and throwing out the food. This may also support lots of business owners in the area that may win donation contract to create the meals. Additionally, this will cut down on food waste on the restaurant level as well, local restaurants that win a donated meal contract have the ability to full fill the contracts with any system approved meals.

This means restaurants can use the donated meal contracts to essentially produce meals that maybe are less desirable or preformed worse recently as to utilize all their ingredients that may not have been used due to underperforming dishes. Regardless, if the meal is donated or the meal is actively purchased by end users for consumption, the system will always profit on a meal sale, including donated meals as these meals are originally paid for by the end user and the system profits off of these sales.

Additional Dine Currency Units/Meals

Additional meals and dine currency units can be purchased through the system or the user's original purchasing agent who issued the meal plan at any time during the month.

Additional meals and dine currency units may be sold at a rate where even purchasing just one meal or one DCU the end user may be saving money compared to purchasing said meal without the system or any affiliation. Once a user has redeemed all their meals for the month or exhausted all their DCUs their account may not be able to pay out for means on a credit basis, and you must have paid meals or dine dollars prior to using them. An exception to this may be for users who are using the system's Credit Card.

e. Added Fee for Delivery

The system may offer a delivery option where users can customize delivery options similarly to how they customize their meal plans. Delivery options are an added cost to your monthly meal plan. Delivery options are sold in packages of deliveries or as an unlimited delivery feature. Packages of deliveries do have a per day maximum of deliveries while the unlimited delivery option does not have a limit.

f. App Interface for Payments i. App Features

The system may have a website as well as an App that users can use to access their account information as well as other help tools. Non-limiting embodiments of app displays are discussed herein.

In FIG. 1, the app may contain their profile information such as their profile picture 11, current balance 6 of available meals, dine currency units, promotions. The app may also function as an ordering/locating tool for locating restaurants around the user that the system approved as well as reviews from actual Diners on their food. User may be able to place their orders through the app as well as place them in person/over the phone verbally. When it comes time to pay for orders that were not placed through the app the user may open the app to reveal their Digital QR code 10 that the restaurant can scan to accept payment. Meals Redeemed in person must be redeemed by the user who is listed on the meal plan account; this may be verified with the Profile Picture 11 that may populate when the QR code 10 or Diner Number 12 is entered for payment. Orders placed through the app can be picked up by any persons; if a person is picking up the order and they are not the system meal plan account holder they must be listed in the order details under the "Pickup" details so the food can be released to them. This may provide increased security and create an environment where it's more favorable for each person to have their own system meal plan while still allowing users to potentially share some meals with a non-system user. The App may also include advertising options from vendors such as the spotlight of the week/day and other paid advertisement options such as promotions and specials, banners, etc.

ii. QR Code

As seen in FIG. 2, all users of the system may be issued a QR code 10 unique to their account; a user may use this QR code 10 to pay for purchases they make. QR Codes 10 can be generated from your app or can be printed from your computer. A QR code 10 hard copy may be mailed to each the system users in case they do not have computer/phone access.

iii. Diner Number

Each system user may be assigned a system number 12 Similar to an account number or a credit card number this number may be unique to the system user and can be used in place of the QR code if the user does not have the QR code handy.

iv. Physical Credit Card Option

The system has an option where a user can apply for a credit card issued by the system through an affiliate bank. This credit card may function as a regular credit card but may have two bonus features. Feature one is that it is tied to your system account and you can use the card in place of your QR code and account number. Additionally credit card users have the option of charging meals to their account on "Credit"; essentially speaking a non-credit card user must prepay for their meals/dine dollars prior to using them, and while this is the same for credit card users there is an exception that if they run out of meals or dine currency units they can still use their credit card, but instead it may reflect on their statement as a credit charge and at the end of the month may be automatically redeemed for additional meals/dine dollars at the current market rate. The second feature credit card users receive is that they may receive cash back at any dining or food related vendor regardless if they are affiliated with the system or not.

3. Who are the Customers of the System and how do they Benefit?

Speaking in the most generic terms, end users of the system (customers) are any persons or entities that are purchasing a good or service from the system or conducting a deal through the system which results in revenue earned for the system.

a. End Users—People i. Adults

Individuals may be the biggest group of customers for the system. Currently Adults eat an average of three meals per day and how they obtain this food ranges in a variety of ways, the main ones being grocery shopping, eating out, & getting takeout delivery or prepackaged delivery of meals. The system may simplify the eating process for these people while simultaneously elevating the level of customer service and care in the Food industry. The system may provide a more transparent look at the foods we eat as well as a simplified way to achieve our food goals whether it's eating consistent meals, eating quality food, budgeting, time management or conforming to dietary restrictions.

1. Fitness Tracking—The system may interface with your phone's app data and may pull the health/wellness data, and it may then integrate this data into the user's profile to give customized data on how many calories/activities was performed compared to how much food was consumed by that user. This may allow users to set goals and have custom tailored plans to help them achieve their health goals and stay up to date with their progress in real time. This combined with our Healthy Meal Badge approved meals can provide users with all the tools required to eat out every day and sustain an above average healthy lifestyle when it come to the food they eat.

2. Meal tracking—Similar to fitness tracking meal tracking may allow users to run stats on all their meal consumption history. This can provide users data on their eating habits, the day times where they frequently consume their meals, favorite meals, and favorite restaurants based on their eating habits. This may also show a grand total of how much they have saved to date by using meal plan credits (vouchers) instead of paying the restaurant directly in cash/credit.

3. Reviews, Locals Spots, Nationwide Coverage—The system may provide an app interface where the users can browse restaurant reviews, locate local restaurants they may not have known about and more. The benefits of users joining the system is that the system can have nationwide coverage. This means chain restaurants that are part of the network as well as locals spots all around the US that have joined the system's network may be available to users regardless of where they purchased their meal plan or where they reside. This may allow users to travel the US without worrying about an extra Food Budget or additional food cost of traveling outside of their home area as now their system meal plan may provide them nationwide freedom without the additional cost worries. This combined with the Review and local restaurant coverage the app provides, users may be able to travel and still enjoy their travel locations as if they were a local who had all the inside food information of knowledge the area.

4. Budgeting—Budgeting is one of the bigger advantage's that a user receives when joining the system. Knowing how much you're going to spend per month on food and knowing you still have the ability to eat out with friends and family and not go over your allocated budget for the month is a sense of security that we all need and want. The system solves the current everyday dilemma of balancing the social aspect/desire of going out and eating with others while trying to stay within your monthly budget and expenses. The system gives its users fixed costs and pricing so there are no hidden surprises at the end of the month and you never have the worry while you're out enjoying your food and social interaction.

5. Pricing—Users of the system benefit in the aspect of Meal Pricing. A principle of The system is that a meal swipe may never cost more than going to the restaurant and purchasing the meal for cash/credit not through the system. For this reason, any meal purchased through the system is cheaper than regularly purchasing the meal from the restaurant, so theoretically speaking each meal swipe used is money the user saved compared to a situation where they did not have a system meal plan. This benefits the user as they are obtaining their meals for a cheaper rate than they would if they were not a part of the system.

6. Donations-Tax Write Offs—At any point in the month before the final day users may donate any number of meals, they have remaining on their meal plan for the month. The donations may go to a qualified local food bank/charity. Because these foodbanks & charities are qualified under the federal government to accept donation and allow a tax write off for donation received, users may reap the benefits of a tax deduction for all meals donated. Similar to grocery shopping for your meals, users always have extra food or ingredients that don't get used and go to waste. Meals are no different. Users ideally would select a meal plan that would accommodate their eating habits, and at month end they may find they have extra meals and instead of allowing them to expire or go to waste users can choose to donate the meals which may result in a tax deductible write off that the system may calculate and supply its user at the end of the year. Additionally, donated meals may play a huge role in feeding the less fortunate members of the community, while simultaneously supporting local restaurants in the area as the local restaurants may ultimately receive the contracts at month end to prepare these meals for the food banks.

ii. Children

1. Children may be end users of the system as there may be restaurants that accepts the system Meal plans on school campuses. Along with on campus school options the system meal plans may also work at all system Restaurants. This may allow kids to not only use their meal plans for school lunches and meals but they may also be able to eat before and after school at restaurants of their choosing. This is a benefit not only for the child but for the parents as well. Currently parents supply the children with Lunch/food money or give them a credit card. With these two options kids have the ability to order expensive meal options on the parent's credit cards, or use the Cash received for other purchases. Currently the US is undergoing an issue where underage kids are using money from their parents that they are given for food to buy illegal substances and drugs. With the system this issue is resolved as kids can only use the meal swipes they have on their account, all the eating habits and meal swipes are recorded and made available for their parent's review; additionally this removes the scenarios where parents need to give their kids cash as now the kids have a fully paid meal plan. The meal plan holds no cash value and thus restricts the kids from using the funds allocated for their food for illegal substances/activities.

b. Corporate/Small Business-Corporate and Small Businesses may become customers of the system as it may provide them unprecedented benefits when it comes to their employees and business expenses. The US is currently seeing a trend where employers are starting to incentivize some food costs for employees to try and attract them back into the workforce or to reward those who stayed in the workforce. As a company, being able to sign up for a business account through the system and being able to purchase meal plan subscriptions for your employees may be an incentive that may pay for itself. Currently businesses are giving a credit or similar reimbursement for meals during company work time, and purchasing a system account/membership for their employees may allow them to have a fixed monthly cost per employee while offering the amenity of free food as a benefit to the employee or future employee of the company. The Business may not only benefit from the increased employee retention/acquisition but they may also benefit when it comes to cost and expenses. Normally businesses are reimbursing food cost but as stated prior a meal through the system is cheaper than the cost of purchasing said meal directly from the restaurant. In this scenario the business saves on the cost of food they are paying for. Additionally, many companies have employees that travel and have extensive food expenses as they must eat out whenever they are traveling for work. Having a system meal plan may allow the traveling employee to forgo any additional food costs when traveling as the system meal plan works nationwide. This may benefit the employers by saving them on food costs for traveling employees while simultaneously providing an organized system for expense tracking.

c. College/University/High School/School/Church/Medical Facility/Office Buildings may all benefit and become customers of the system. Any establishment that has a food space such as a cafeteria or kitchen can sign up with the system and list their space as a potential pop-up restaurant, and these spaces may be listed through the system App and registered system Suppliers can bid and sign up for the opportunity to setup a popup restaurant in the designated food space. The system may earn a commission off of each transaction facilitated, Groups such as schools and bigger facilities may benefit as they may have the ability to bring local restaurants into their establishment thus catering to their residents/employees/customers. Based on feedback from their students/employees/residents/etc. Facilities/Groups can change the restaurants that occupy their food space. Contracts can be set for time periods such as Monthly, three-Month/six-Month and Year long. This benefits the system Suppliers as they get the opportunity to expand into niche markets that they would never have the opportunity to fulfil in the past, and it benefits the Facility/Group as they get to rent out their food spaces and earn income while simultaneously providing a food amenity to the customers/students that use their facilities. An example of this benefit would be an office building that has a built-in cafeteria, and the landlord would benefit if they added this cafeteria to the system App and put it up for rent, a local restaurant may bid or accept the lease terms and open up a pop-up restaurant in the cafeteria location. Now residents of this building can enjoy food from a local restaurant with the convenience of it being located inside their building, and the landlord has a premium compared to other buildings in the area that don't offer restaurant amenities. Another benefit to this is the group/facility manager has the ability to survey the residents/students/employees to see if the majority of consumers would like to change the restaurant or allow another restaurant to setup shop to change the food options. There are no restrictions on this as any type of facility with a qualifying food space can offer this to its "users" (customers, members, employees, students, etc.). Even establishments like Gyms can take advantage of this.

d. System Suppliers may also be customers of the system. Once suppliers sign up and are accepting meal swipes their facilities may start to accumulate Data. Data accumulation may essentially capture everything that occurs during the process of dining. Data such as how many meals are sold during different hours of the day, which meals sold the best on which days, which users are likely to buy on which days, etc. Additionally, the system may store and analyze all this data to build profiles on suppliers and users to customize the recommendations and stats they can obtain. Suppliers may benefit as they can now obtain data on competitors in the area, and they can compare how often their customers eat at other establishments and even see what the most common dishes their best customers or most frequent customers order elsewhere. Some data may be offered for free to suppliers while other data may incur a fee for obtaining it. Paid data as well as advertising options may provide a revenue stream for the system while also benefiting the suppliers. By purchasing the advanced paid data or promotions/specials the suppliers can increase their business and customer base by catering dishes and promotion to their customers based on customized data obtained from the system on their customers. Using paid data to identify target markets/users and target time frames associated with increased meal ordering, suppliers can increase their success rate in bringing customers through the door. Advertising and Promotions can benefit the suppliers by increasing their reach to more users and showcasing/advertising their restaurant deals and products.

4. Who can Monetize by Selling System Subscriptions?

a. The system Company—Meals sold will originate from the system but other monetizers may be selling subscriptions as well. The system may allow competitive pricing in comparison to other monetizers but essentially may allow monetizers to sell their meals plan slightly lower so there is an incentive for end users to buy from other monetizers instead of the system. At the end of the day, subscriptions sold by other monetizers will be subscriptions the system sold to the monetizer at an exclusive lower rate that is not available to the public. This may allow end users to purchase directly from the system while simultaneously motivating them with the option to purchase their meal plans through a monetizer if they have the ability to, as they may get a better deal. This may create free marketing and business growth for all the system Monetizers. The system may sign exclusive deals with each Monetizer to outline the qualifications for who they are allowed to sell meal plans to. An example of this would be allowing a college to sell meal plans to all their students, with a special exception that one additional family member for each enrolled student is eligible to purchase a meal plan from the College (Monetizer). All students at the college may purchase their meal plans through their school as they may get a better rate compared to purchasing directly from the system; additionally the College may benefit as they can now also sell a meal plan to a family member. Without the system and the system Meal plans the College (Monetizer) may never sell a meal plan to a family member of an enrolled student as the meal plan would essentially be useless if the family member wasn't enrolled at the school and able to use the meal plan for the limited on campus dining options. With the system Meal plans students may not only be able to use the meals at on campus establishments but may also be able to use it at all nationwide system affiliated restaurants/suppliers. The restrictions on monetizers may create a market where Monetizers can earn more than they previously ever could while allowing fair practices so all monetizers can equally share in the end user customer pool.

b. Corporate Businesses—Corporate Business or business containing a qualifying number of employees can apply to become a monetizer on the system. Becoming a monetizer may allow these large companies to essentially sell the system Meal plans/Subscriptions directly to their qualifying end users. Similar to other Monetizers there may be restrictions regarding which end users the Business is allowed to sell meal plans/subscriptions to; an example of this would allow the business to sell meals plans and subscriptions to their employees as well as one additional family member for each employee that works at said company. Once the business is signed up as a monetizer they may not only have the option of offering meal plans to their employees as a competitive hiring or employee retention amenity but can also offer a discounted subscription/meal plan to other employees that are not being offered a paid meal plan as part of their salary. Working at a fortune 500 company as an entry level employee you may not get offered a free system meal plan as part of your pay, but having the ability to purchase the meal plan and subscription through your employer at a discounted rate may still be seen as an additional benefit to consider when comparing work environments of different companies. Think of this feature as something similar to Health Insurance, where some companies offer it inclusive in your working salary while others offer the option to buy into the company health plan which usually provides higher coverage or equal coverage but at a better rate than the market average. Setting up a company as a monetizer is different than opening a business system Account, and being a monetizer allows you to resell Subscriptions and meal plans and profit (revenue stream) while a system Business account allows you to purchase meal plans and subscriptions for your employees and manage the monthly fees and renewals through an enterprise dashboard, but does not allow you the ability to offer meals plans and subscriptions at a discounted rate or to additional end users that are not employed at the business.

c. Colleges/Universities/Schools—Schools would become another monetizer with the system. The way they would monetize is similar to the system as a company as well as Corporate Businesses, and they would sign up as a monetizer and would resell subscriptions and meal plans to their end users, in this case it would be students. Higher education schools already offer a form of meal plans, but these plans are normally setup to work at on campus dining halls. High school and middle schools don't normally offer a meal plan to student but instead offer cafeteria style eating quarters where student can bring their lunch and eat it or can purchase a meal from the school's cafeteria. Once signed up as a monetizer schools would be able to sell their students system meal plans and subscriptions that would replace their traditional eating options. For higher education schools instead of offering their students Meal plans that only work at on campus dining options they would now be able to offer the same type of meal plan at competitive pricing, but with the major benefit of students being able to use these meal swipes at any restaurant or eating establishment nationwide that accepts system Meals. This gives the school the opportunity to not only supply a better meal plan product to their students but can also utilize other features of the system such as the Kitchen/Retail space rental options that would allow schools to bring in local restaurants or chains to supply food to their students. Becoming a monetizer may allow schools to profit and generate revenue more than they have the ability to now as becoming a monetizer may open the schools up to a whole new customer base; currently schools can only sell meal plans to student who attend and may actually be able to utilize the on-campus dining halls. Signing up as a monetizer may allow you to sell meal plans to the same amount of student plus the additional end users that the school's agreement allows them to sell to. An example of this would be allowing schools to sell a meal plan to each enrolled student plus one additional family member per enrolled student. This may allow school access to a whole new customer base as normally a family member would have no benefit or reason to buy a meal plan from a school they don't attend, but now since they can purchase a system subscriptions and meal plan cheaper than going directly to the system, they would have a benefit from purchasing directly from the school.

d. Churches and houses of worship—Churches and houses of worship would become added entities that can monetize with the system and earn revenue for subscriptions/meal plans sold. Similar to Schools and corporate businesses, they would have the ability to sign up as a monetizer and would be able to sell discounted subscriptions and meals plans to their members. The same restrictions and benefits would apply, members would benefit from joining the church or house of worship as they would qualify to purchase a discounted plan from it, and the entity would benefit from the revenue earned from each meal plan/ subscription sold.

5. Who are Suppliers of the System?

a. Restaurants: Restaurants may be one of the main suppliers of the system. A supplier is essentially a person or entity that sells food or meals and accepts system meal credits (vouchers) and DCUs as a form of payment. Both Chain and local Restaurants may be able to sign up as a supplier of the system and once approved may be able to submit meals for pricing and establish an agreement with the system on meal credit reimbursements. Restaurants are already equipped to join the system and are already selling meals so the barrier to entry is extremely low and may allow all restaurants to gain access to the customers of the system. This may benefit all restaurants especially smaller local restaurants.

b. Delivery Services: Delivery services such as Uber, Lyft, Postmates, etc. can register to become suppliers on the system, and they would supply delivery drivers that would fulfill delivery meals purchased by system end users. The system would contract with the delivery supplier to integrate interphases so drivers can receive delivery jobs through the supplier's app, and this may increase the amount of delivery drivers on the road as well as offer competitive rates to drivers thus increasing the revenue of the delivery driver market. Suppliers would have a negotiated contract and rates with system once they register as suppliers.

c. Small Pop-Up Chefs: Small Pop-up chefs may become a main supplier of the system as part of the system's mission to encourage the creative food creations of Chefs and help them get their names and food creations out to the public. Chefs may be able to sign up for a supplier account on the system, and they may be required to pass a minimum kitchen inspection and equipment requirements to ensure they are meeting health and safety guidelines. Once registered and approved with the system the chefs may be able to list their meals and may be featured as a supplier on the system platform allowing them to reach customers through the app and advertise to get their name out there. They can set their own hours and can rotate between approved dishes they register to allow them the flexibility to cook their specialties and offer their meals to the public. This may allow chefs to have an option of starting their own "kitchens" and restaurants instead of working for a restaurant as their Chef/ employee. The system may assist with the financial aspect of processing the payments and issuing the revenue to the chef. Along with system delivery options chefs may be able to reach a much broader range of customers with a very low barrier to entry thus increasing the competition in the food industry to increase their quality and creativity.

d. Sporting Event Venues-Restaurants: Sporting Event Venues-restaurants may be able to register as suppliers on the system. The sporting event venue (stadium) themselves may register on the system platform as a retail/space rental. They may advertise their spaces so other suppliers can bid for the opportunity to setup a restaurant in their venue, and once the restaurants are established, they can register on the system the same way a normal restaurant would and may have the chance to not only sell meals during sporting events but may also be able to sell meals on days where there are no sporting events if the stadium allows this. This may increase the attendance at events as food cost is one of the top deterrents of people regularly attending events. Please note sport event venue restaurants can still join the system even if the Sport Event Venue did not register with the system and did not lease their kitchen spaces through the system platform.

e. Grocery/Convenience Stores (Ready to eat Meals/snack combos): The system recognizes that end users may want to incorporate something where they still have the ability to cook a home cooked meal within the system Meal plan; after all the system is meant to support the end user with meal/ food budgeting by providing a fixed cost per month based on their plan. Grocery Stores and convenience stores and even stores such as gas station stores can sign up on the system as a supplier and offer a combination of food and/or drink package that can qualify for a meal swipe. This may allow grocery stores to join into the market of system end users. Currently some grocery stores offer food options and meal options and some even offer a package of all the raw materials needed to cook a meal. Grocery stores and convenience stores may be able to submit these combinations for approval and pricing to the system so they can qualify for meal swipes thus allowing them to sell food items to system users. This may also benefit the end user as although the system recognizes the immense benefits of eating out and not having to cook/clean or worry about ingredients/measurements but also recognizes that some end user may want to cook a meal and this may allow them the opportunity while staying within their meal plan and not incurring additional costs. Additionally, this may allow convenience stores such as those open twenty-four hours a day and gas station to also capitalize on the end user customer base of system as users may be more inclined to purchase something after hours that they normally couldn't because it would be outside their budget but now, they can as their system meal swipes may be accepted. This may also benefit the stores as they may now be competing within the restaurant and meal industry where before they may not have been seen as a competitor for meals but instead as a grocery store.

f. Nutritionists: Nutritionists are a special type of Supplier. They do not supply the system with any physical meals or food. Similar to a chef who "Licenses a Meal" with the system and earns income by leasing these meals to other suppliers, Nutritionists provide a service to the system end users that wish to pay a fee and have a custom meal plan built for them by a nutritionist. Nutritionists may evaluate all the goals and needs of the end user and may create a meal plan that may advise users which restaurants and dishes they can eat and which they shouldn't eat at so they can stay within their goals. They can also help users who are traveling and want to stay within their fitness or health goals to ensure that they are meeting their food requirements when in areas that are not familiar with. Nutritionists may earn money based on meal plans created and other metrics.

6. How can Suppliers Benefit? (Please note in all the below instances customer Names and personal information may never be shared, and each end user may be assigned a nonidentifying ID number as to protect the end user's safety and privacy, and end user eating data may be linked to the non-identifying ID number which may be different from the system Customer number)

a. Customer Eating Data: Suppliers can benefit in numerous ways from joining the system. One way is access to customer Eating/App Data. As mentioned, the system may track an immense amount of customer data, from eating habits to traveling habits, food preferences, spending habits and more. The system may provide some of this data to suppliers for free and some of the data may be pay-to-access. The system may be able to make deductions based on its data analysis that may benefit the restaurants such as which customers are likely to eat at certain times of the day, or how likely customers are to try a new dish, even which customers would be likely to leave reviews versus ones that would not be likely to leave a review. All of this data may not only be available in either a paid or free form to the suppliers, but the data may be live and in real time, and it may also track the users based on their geographical location based on their smart phone location. This may allow suppliers to offer last minute and live deal and promotions if they notice and increase in end users around that would be likely to take advantage of the promotion and come into their restaurant. This may also provide a more realistic return on investment for each promotion and paid service the suppliers use.

b. Local Customer Trends: the system may offer suppliers not only data on their existing customers (end users) but also data on customer that may never have been to their restaurant or had their food before. In conjunction with the live updates on customers in the area and available data on them, the system may also offer suppliers the ability to see local market trends in their Geographical area, and this may consist of things like the local trends of which food categories and ethnic food groups are trending in your local geographical area, how likely people in your area may be to try a new type of dish or new type of ethnic food, how many total meals have been sold in a period of time within your area, and many more things. This may give suppliers ample benefit in determining business practices, food selections, and it may increase the success rate of not only their current food offerings, but it also ties back into the growth and scaling tools for businesses, and local data trends may be readily available to suppliers in that geographical region; additionally suppliers can purchase access to local trend data in other areas to increase their success in potentially opening more location in other areas if their business and food offers match the local trends in that area. An example of this would be a sandwich/deli restaurant (supplier) purchasing local trend data from two towns over, as the system recommended this to the supplier versus one town over data as system knows two towns over may be more favorable data where the local trends support sandwich/deli shops. The supplier purchases the local trend data of two towns overs and learns not only does the local trends support sandwich/deli shops but also that the late-night hours are the highest volume times for sandwich sales. The restaurant can now open a location two towns over that supports late night hours and may have a higher success rate as this town offers the best opportunity for this type of business as local trends and actual sale data support this, and this would provide substantial benefit compared to a growing restaurant that didn't have the opportunity to study and purchase the local trend data and may have selected a location with very few end users who like their type of food.

c. Higher Volume of Sales: the system may benefit suppliers ultimately on their sales volume. an objective of the system is to create an environment were eating out is the normal practice, and this may create an increase in total amount of meals purchased at restaurants. Joining the system may give the restaurants access to all these purchased meals and may inevitably increase their sales volumes. Joining the system may not affect or decrease their current sales volumes as their customers may still continue to eat at their restaurant once they join the system, whether they are paying cash or paying a lower rate through the system (meal swipe). The difference is now the restaurants may have access to a whole new market of customers, people who wouldn't have eaten at their restaurant as they normally eat and choose to spend money/support restaurants they have eaten at in the past and like. These are the end users that the suppliers would never have had a chance to have as a customer. By joining the system, end users may be more inclined to eat at new establishments as they may have trustworthy reviews, upfront pricing and information, as well as peace of mind they are not going outside their budget or spending money on something they are unsure of. Currently most people don't eat out regularly as their primary source of food, and when they do choose to go out and spend money it's not the normal occasion and although may not be a "special" occasion it is special in the sense that it's less frequent than how they normally choose to consume food. Due to this they are more reluctant to try something new as there is a fear of trying a new establishment and not enjoying the experience or food, thus wasting their special occasion. The system looks at the cost of the meal plans as sunk costs as users pay for their meals ahead of time and based on their plan (flexible vs non-Flexible) these meals may expire if they are not used. For this reason, the user doesn't see a negative when they try a new restaurant and don't like it as they are not spending additional money for a new experience they may end up not liking. Instead the system allows them to try and gain new experiences without the restraint of giving up something else (spending money on a restaurant they didn't like and not having money for a restaurant they do like because they chose to try something new), which is what they feel when they pay for a meal they didn't enjoy after eating it.

d. Meal Licensing: Meal Licensing is a key way in opening a new stream of revenue for system suppliers. A supplier as stated can be a wide variety of things from a restaurant all the way to an individual chef. Meal Licensing through the system allows the supplier a channel of growth directly linked to the system's supplier roster. Once a supplier signs up for the system they must submit meals for approval and pricing. Once approved they may start selling these meals for system meal swipes. Once their meals are active there are several other things the suppliers can do with their meals, one being the Healthy Meal Badge, another being meal Licensing. If a supplier believes their meals (recipe and process) are unique and have potential to have a following, they can submit their meal (recipe and process) for a system Meal license. The system may evaluate the ingredient and process to ensure its unique and not already licensed through system. Once Licensed the supplier can receive offers from other suppliers anywhere in the world that are a part of the system Network. These deals may be structured on a licensing or royalty basis where the supplier may receive a flat fee for each of their Licensed Meals sold through another supplier. Once either supplier terminates the agreement or the agreement expires and is not renewed the supplier who was "renting" the Licensed Meal may no longer be allowed to sell the meal at their restaurant for system customer or regular cash paying customers. Licensed meals may be protected not only by a contract but also may be backed by the system so any supplier breaching a Meal License agreement may be prosecuted by the system. The system may also conduct random audits to ensure licensed meals are accurately being prepared as to preserve the Licensed Meal's Public Integrity of its image. This may allow suppliers with creative and successful meal ideas to scale and spread their food creativity around the world without having to open physical locations and endure expense tied to physical locations, while earning "passive Income". Meals can be licensed out to as many suppliers as the Meal License owner would like, and meal pricing may be the same across all suppliers with the exception of approved increases in price for approved expenses used to create the meal due to geographical locations or ingredient sourcing availability.

e. Delivery Monetization: Delivery monetization is a huge benefit for suppliers. As described earlier, suppliers who offer and even supplier who didn't offer delivery options prior to joining the system may both benefit from the delivery monetization. If the supplier already offers delivery options, the system may allow them to still fulfill their delivery orders, but may reimburse suppliers at a predetermined rate for deliveries made to system customers. Suppliers who don't offer delivery options can benefit from joining the system and accessing the delivery customer data and seeing how likely their existing customers as well as how likely potential customers in the area would increase their consumption at their restaurant if they offered delivery. This may make offering delivery easier for suppliers as they may have market data to support and increase the likelihood that they may increase their revenue by investing in delivery drivers, once they start offering it and generating delivery reimbursement payments, and they may end up subsidizing the cost of employing the delivery driver, breaking even on the delivery driver(s), or even making money on the delivery driver(s) in addition to their increase in meal sales. Not only that but the suppliers whether they subsidize, break even, or profit from the delivery drivers they get the benefit of offering delivery services to their customers who are not end user of system and may not have spent money at the restaurant if they didn't offer delivery options.

f. Free Marketing Through the system App interface: Suppliers may benefit immediately after joining the system as once they are approved and listed on the experience they system App interface they may receive free "Marketing" and they may gain exposure to customers; they may be able to customize their restaurant descriptions and information allowing system end users to learn more about the restaurant and ultimately try the restaurant out. System users may use the app to view local restaurants, sort by rating and review and other metrics. Being included in the system search may provide marketing to the suppliers as the system app may have millions of end users browsing local restaurants looking for places to eat, knowing they can eat at your restaurant and being shown your restaurant may increase your local presence and internet presence and overall increase your market presence thus benefiting the suppliers.

g. Healthy Meal Badge: the system may offer a designation to suppliers whose meals are submitted and approved/qualify when compared to the Healthy Meal Badge standards. Healthy Meal Badges may be awarded to dishes that End Users can consume on a regular basis and may be considered complete & healthy meals based on the current food pyramid and ideal meal compositions designated by the Leading health organizations. Healthy Meal Badge criteria may be established internally within the system and may be advertised to suppliers who inquire on the criteria. If a supplier believes their meal (badges can be per specific dish/recipe) meet the criteria can register the meal and submit it for approval, and a system employee along with a number of randomly selected customers whose meal data shows they frequent the restaurant and have ordered the dish that is being submitted, in the past, may evaluate the dish. The employee of the system may witness the dish being prepared and may monitor the ingredients and amounts of ingredients (all recipe and ingredients may be supplier protected information and may not be shared by the system) to ensure they meet the Healthy Meal Badge requirements, the dish that was witnessed by the experience they system employee may then be given to the number of customers who may evaluate the dish to confirm it matches/tastes the same as it normally does when not being evaluated. This is to ensure the suppliers are not falsely trying to obtain the Healthy Meal Badge. If approved the meal may receive the Healthy Meal Badge, the meal may be featured on the restaurant's menu and may have a recognizable Healthy Meal Badge icon next to it informing the end users that this is a Healthy Meal that had been vetted by the system to ensure nutritional values. Not only may the badge be placed on the menu but end users may have filters they can apply to their restaurant map that may filter only restaurants with health meal badge approved meals which may increase the desire for these meals to end users thus benefiting suppliers who have approved meals. This may also play into effect with the system's app interface that integrates into the smart phones fitness and health data, providing a complete health tracking system for all end users that can track their activity, movement, steps, calories burned, and then can even take it a step further and recommend a meal/dish based on the fitness variables of the end user, all of which occurs in real time.

h. Nutritionist Revenue Sharing: the system may share in revenue with Nutritionists that are signed up and approved supplier on the system platform. Nutritionist can benefit by offering their service to end users who are looking for nutrition or food advice as well as meal plans whether they are generic or custom. Nutritionist can also be kept on Retainer by end users so they can constantly interactive with nutritionists; this would be an extra monthly/weekly fee depending on how the user decides to sign up. Since the system stores user data and has access to all the approved supplier data. Nutritionist may be able to create custom meal plans that are specific down to the dish they suggest the end user eat. Nutritionist can create custom meal plans which they can charge end users for (flat Fee, custom to user), can create their own meal plans specific to geographical locations (flat fee, same meal plan for all users), and can offer Consulting (set price reoccurring fee, duration depends on user and how they sign up). These geographical meal plans can be purchased by end users without using the Nutritionist Consulting Service for a flat fee, and the flat fee may then be shared between the nutritionist and the system similar to a "Licensed Meal" through the system. This may allow Nutritionists to spend time creating healthy meal plans that actually direct end users to the exact restaurant and dish they recommend, and they can build many meal plans they believe can benefit certain groups of people and end user can purchase these at their may thus earning the nutritionist's Passive income.

i. Access to bidding on school, corporate, and vendor kitchen spaces: Suppliers may benefit from joining the system when it comes to increased access to new opportunities. These opportunities may have higher success rates than opportunities that are available to non-system suppliers as they may come with dedicated customers. Being a supplier with the system may allow the restaurants to browse the kitchen spaces that are available in any geographical location, the difference is through the meals system app, and space listed can have market data that is attached to them. This can show suppliers potential foot traffic numbers, previous restaurants that were in that space and how they performed, key dates and times for business as well as other data that can be helpful such as end user meal trends located within the dedicated customers. Most of all the benefit comes with the fact that these spaces are located in areas that have dedicated customers, for example school cafeterias, sport event venues, colleges, corporate building, and more. All of these kitchen spaces may be more successful as the locations cater to specific customers: for example the college cafeteria would automatically give you the highest chance to capture a student's meal swipe since you are located on campus and the convenience factor is unlimited. Same goes for a high school and sport event venues, and in these cases the dedicated customer base is higher or stronger as high school student can only bring their own lunch or consume a meal from the cafeteria, whereas a sporting venue may not allow you to bring your own food inside thus "forcing" people who attend these sporting event to purchase food from their restaurants.

j. Spot Lighting: Spot lighting is a term in the system that describes the practice of the system analyzing user data and supplier data to spot light key areas of improvement or opportunity for the suppliers. Spot lighting may provide the suppliers suggestions on potential new dishes, potential dishes to remove from the menu or potential dishes to add back to their menu, and it may also look at things like user reviews, perhaps suggesting policy changes or hours changes or possible promotions deals. Spot lighting may also help suppliers spot trends within their restaurant and allow them to capitalize on positive trends and resolve negative trends before they get out of hand.

k. Small Business Specific Benefits:

i. Recognition through app interfaces: Although as outlined above small business may enjoy not only the same benefit as other suppliers when they are listed on the app interface and receive the free marketing and publicity, small businesses may benefit more as many chain and larger suppliers have a market presence or have advertised to get their name out there, and this is tougher for small businesses, so being listed alongside other suppliers may create a greater benefits for small businesses and local restaurants.

ii. Potential for Monthly Donated meals contract: As outlined previously each month during the calendar days of that month, end users may be able to donate any number of their available meals. These meals may go to local approved charities and depending on the availability in the geographical region user may have the ability to specifically select which charity they want their meals to go to if more than one is available. At the end of the month the total number of meals donated is calculated and the system may distribute the meal contracts to a variety of suppliers based on pre-established criteria. Criteria may vary across different categories, but the biggest portion of the meals donated may be awarded to small business/local restaurants that are classified as small business/local restaurants by the system. Chains and larger restaurants may be able to win some meal contracts but the vast majority may go to small business and local restaurants. From there the criteria may break down further to look at best review that month, most user end user engagement, most market money spent through the system, most marketing money spent with the least return, and etc. This may benefit small business and local restaurant immensely as the system anticipates these meal contacts to be large and contain many meals. During the next month the system may award the meal contracts to a vendor on a weekly basis disbursing the meals donated the previously month equally throughout the next month. Meal Contracts may go to the suppliers who may create the meals packaged in to-go containers knowing the meals must keep a shelf life of one week or seven days. The suppliers may get paid per meal created and this may increase the revenue of small business and local restaurants as it may supplement their weekly sales.

iii. Advertising: Small business may now have the ability to advertise directly to consumer and potential customers, and they may have the ability to do targeted advertising to consumer groups vetted by the system to ensure they fit a criterion that supports a higher acceptance of that small business. For example, a small business can advertise to an area and target users who frequent restaurants that serve the same type of food as their restaurant incentivizing them to try out their restaurant instead. This may be more successful than advertising with a third-party company or service that doesn't have access to similar customer data. For more Detailed Advertising and Promotional tools the system offers please review the App Interface for Suppliers (Advertising/Promotion Tab) such as that at FIG. 8.

iv. Cost/Sales analysis Tools: the system may have built into the app interface an inventory/cost analysis tool. The system aims to assist small business by helping them keep track of their food inventory, costs and profitability, and this in turn can make suppliers more efficient with their food ordering from distributors as well as determine if dishes/meals are profitable and worth keeping, and it may also allow supplier to scale to larger volumes of sales without risking being under stocked with food supplies.

7. Community Programs a. Donated Meals: The system may benefit the community with the help of all the community members that are end users of the system and choose to donate meals. The system may work with local Charities to ensure they are qualifying to receive meal donations from the system. The system may also select Charities within the set geographical locations to ensure local communities are reaping the benefits of their community members. If there are no Local Charities and there is qualifying number of donated meals in that area the system may work with National Charities to help establish a Meals Kitchen (Soup Kitchen) in that community that may qualify for Donated meals from the system and may help feed the local community which also helps the local restaurant owners in the area earn more business.

b. Supporting Locals: As mentioned above the system may establish programs within the local areas of the system end users and suppliers these programs may be in the forms of Donated meals to Charities, Assistance in Establishing a local Food Bank (Soup Kitchen), having policies in place to allow Local Business and Small business suppliers increased chances in obtaining Donated Meal Contracts, and more.

c. Local User Engagement Review Point System: When users eat at system suppliers, or are selected by the system as a Local based on their food data, they may be incentivized to leave a review, the more in-depth and inclusive of things like pictures, etc. the more points these end users can earn. The points may be sponsored by the system and may not cost suppliers anything, points can be redeemed by end users for things like meal swipes, Dine currency units and more. In return this may benefit suppliers as they may obtain more review thus boosting their public image and desirability to system end users, and it may also benefit end users as they may get more localized food advice and review and may have an easier time locating local trending spots when visiting new geographical locations.

App Interface a. End User Interface-Meal Plan User

Account tab 1: the app layout for a meal plan user may consist of tabs, or screens. these tabs may be located along the bottom of the app screen allowing a user to click on the tab which may bring up that page. The first tab may be the account page, as seen at FIG. 1.

Profile Pic 11: The account page may include a Profile picture of the etc. system account holder Account Balance 6: This may show the total amount of meals remaining in the meal plan as well as the total amount of Dine currency units remaining, and upon clicking on the account balance stats it may bring the user to a transaction history page that may show all the previous meals and dine dollars spent.

Promotions available 7: This may show the end user what discounts and/or promotions the user has available for them to use on a future meal purchase.

Active Orders 38: This section may show active orders that are either in progress (dine in meal being created), or that are in progress as they are out for delivery. This section may also have an option for current orders and upon clicking on this section it may bring you to your shopping cart.

Meal summary of past meals 9: This section may show the most recent restaurants the user has eaten at as well as what they ordered. Upon clicking on this section, it may also bring the user to the transaction page that was referenced in Account Balance.

Payment Tab 2: This page may contain all the financial payment information as well as purchasing options for more meals/dine dollars, and an embodiment can be seen at FIG. 2.

QR Code 10: The QR code 10 can be on the payment page and can be used to pay for meals through the system when you are at a supplier's locations (restaurant), orders placed through the app may not require the QR code 10 to be shown Diner Number 12: every system meal plan holder has a unique QR code as well as a unique Diner Number, this number similar to an account number can be used in place of a the system QR Code.

Expiration of Meal Plan 13: This section shows when your meal plan is set to expire and whether or not the user is set to auto renew Buy More Meals/Dine currency units 14: This section may showcase the additional meal plan packages or package upgrades that you can purchase, and there is also an option to create a custom meal plan with a specific number of meals and dine dollars.

Restaurant Tab 3a, 3b: This is a Tab that may connect the end user meal plan holders with suppliers (restaurants) in the area or any area they select, and example embodiment are at FIGS. 3 and 4.

Restaurant Map 15 and Search Ability 16: This part of the Restaurant tab 3 may show the user a map 15 of the area and suppliers (restaurants) locations, and the user may be able to freely navigate the map 15 and as the user moves locations on the map 15 the map 15 may refresh to show the Suppliers in that area. The map 15 may be interactive where the users can click on suppliers to view their Restaurant page and menu. The search bar 16 may allow users to search locations, restaurants, types of food, specific dishes, or meals/restaurants based on their menu and meal costs.

Reviews 17: The restaurant tab 4 may have reviews (end user Reviews) of suppliers (restaurants), and upon locating the supplier on the map 15 or searching for the supplier the user may be directed to the Restaurant Page 4 which may list things like the restaurant's food category, description, dishes, menu, pictures and Reviews.

Menus 18 with Meal Pricing & Nutrition Facts: The Restaurant tab 3a may include menus and pricing (meal swipes, dine dollars, cash only items) as well as nutrition facts on all menu items listed. Nutrition facts include calories, and allergy information and may even include ingredients. This may be accessed by locating the restaurant and clicking on their Restaurant page and browsing the menu option.

Restaurant hours 19a-b: Restaurant hours 19a and special holiday hours/events 19b may be listed on the Restaurant tab 3b this may be accessed by locating the restaurant and clicking on their Restaurant page.

Restaurant Description 20: The restaurant description 20 is a space for Suppliers to express the vision or concept of their restaurant or even just share something about their restaurant, and this can include the types of foods they serve, the motivation for opening their restaurant, fun fact about their restaurant, famous history about their restaurant and much more. The restaurant descriptions may be accessed by locating the restaurant and clicking on their Restaurant page.

Food Category 21: Although suppliers have many customizable and free writing fields the Food Category is a classification Suppliers apply for when they sign up for the system, and they can modify this after sign up if they wish but all Categories may be submitted and approved by the system as these are set categories that the system uses to categories restaurants so users can filter and locate the restaurants they are looking for. This may be accessed by locating the restaurant and clicking on their Restaurant page.

Log a Complaint on Restaurant 22: This feature is available on the Restaurant tab 3*b* and is located on the individual restaurant pages. If an end user makes a purchase at a restaurant with a certain number of hours the option to log a complaint 22 may be visible. This may be located on the restaurant page 4 at the bottom and may disappear seventy-two hours after the user has purchased something from that supplier. If the user had a bad experience and feels a Review 23 (public posting) is not the right place to share their negative experience they can submit a complaint and a system Representative may review it and attempt to resolve the situation, if possible; if the end user feels the restaurant is not fulfilling its obligations or level of customer service these types of things can be submitted through a complaint.

Leave a Review 23 on Restaurant: This feature is available on the Restaurant tab 4 and is located on the individual restaurant pages. If a user has made a purchase at the supplier within a time such as seventy-two hours, they may be eligible to view the "Leave Review" option on the restaurants page and leave a full review of their experience. If the user does not purchase anything at the restaurant but is within the system-allowed distance from the supplier, they can still leave a review but the review may be limited to their limited exposure to the restaurant. They can leave reviews on visual appearance, and interactions they may have had, but cannot review things like food items, etc. Additionally, limited review may be monitored by the system before they are publicly posted. Users may earn rewards for some review they leave based on the restaurant and end user status with the system.

Health/Wellness Tab 4: This tab may allow the end users to track their health and wellness everyday journeys, and an embodiment can be seen at FIG. 5. The system may also interface with any built-in operating system fitness apps so it can incorporate things like steps walked, heart rates, calories burned, activity times, etc.

Total Calories 24 per day/week/Month, etc.: On the Health/Wellness tab 4 users may see a total calculation on their calories consumed, and the system may automatically calculate this for the end user if they activate this tab and features. The system may not only calculate the calories and show the user the stats through a time period specified (day/month/week, custom) but it may also allow the user to add additional snack or meals they consume that are not purchased through the system app or are not paid for using the user's system QR code or Diner Number, and additionally users can edit automatically calculated purchased meal in case they did not consume all the meal contents. If the end user has the full features of this tab enabled and are integrating their device fitness tracking, the system may also be able to show the user the total calorie deficit or excess the user consumed in the selected time period (day/month/week, custom).

Average Calories 25 per day/week/month, etc.: Similar to Total Calories Average calories may track and calculate the same data and may allow the user to easily view their average calorie consumption for a set selected period of time.

Integration with Mobile App Data 26: the system may integrate with device app data such as Apple Health. This may allow the system access to health/fitness data such as calories burned, steps taken, normal activity times, and much more. By integrating with these apps the system may be able to supply the end user more refined data and suggestions. Enabling this feature may allow the system to suggest the best time of day to consume a meal based on your normal routine and calorie burning times. It may allow the system to suggest restaurants or even dishes based on calorie deficit or calorie excess goals the users may have (gaining or losing weight). The system may be able to benefit the end users by suggesting more custom recommendation based on the app data analytics like recommending a meal after a workout or within a set time frame from a normal routine event.

Diet Goals 27, Advanced Meal Planning: the system may provide tools for users who are trying to achieve certain diet or fitness/health goals. Tools such as advanced meal planning may allow users to chart out meals for the week, selecting meals they want to eat on certain days or even at certain times of the day. The system may remind users of things like scheduled meals and even provide reminders for things like when you need to leave to make it to the restaurant on time. When users use these tools, the system may calculate all their meal stats ahead of time so the users can ensure they are staying within their meal goals whether it be calorie based, protein based, carb based, or even specialty diets like vegetarians and vegans. Advanced meal planning may also offer users the ability to seek advice from Professional Nutritionists that can create custom meal plans that advise users which restaurants and even what meals to eat, and the nutritionist may be able to preselect the meal schedule for the week and can even accommodate the users when they are traveling outside their normal geographical location as the system is nationwide. The nutritionist service may be a feature that has an additional cost to end users, and the cost may be reoccurring or a flat fee depending on the service requested.

b. End User Interface-Supplier

Account Summary Tab 28: The account summary tab may include information such as restaurant stats and earnings as well as allow suppliers to modify their restaurant page(s), and an embodiment can be seen at FIG. 6.

Total Sales 29: This section of the account tab may show the supplier the total sales volume both financial and meals sold for a selected period of time.

Total Deliveries 30: this section may show the total amount of deliveries completed; this may show total delivery stats as well as revenue generated from Deliveries.

Profit/Loss 31 for Food & Deliveries: this section of the account tab may show the supplier the total profit or loss for a set period of time (day/week/month/custom) for both the meals sold and deliveries completed, and suppliers may have the ability to enter certain values in to improve the accuracy of the reporting, and this data may include delivery wages, food costs, etc.

Submit another Menu Item 32: This section of the account tab may allow the supplier to submit another menu option to the system for approval, and once submitted system may evaluate the meal and approve/deny the meal.

Remove Menu Item 33: This section of the account tab may allow the supplier to remove a menu item that has been approved and is set to active. Supplier may deactivate a dish or delete the dish if they wish to no longer serve it, and deleting or deactivating a dish may be approved by the system before its officially changed in the platform. This is to ensure suppliers meet the minimum dish requirement to be part of the Diner Number system Network.

Pictures of Restaurant & Meals 35: On the account Tab suppliers may be able to upload and view/remove pictures of their restaurant and menu items. They may also be able to edit the Restaurant description in this area and request Food Category modifications.

Delivery Driver Tab 36: In embodiments, if a supplier offers delivery services this tab may be automatically enabled, and in others if suppliers do not offer delivery services this tab may default too not visible.

Registered Drivers 37: On the delivery Tab 36 there may be a section where the suppliers can view a list of their Registered delivery drivers, and here they can add or remove drivers as well as modify current drivers information.

Delivery History 38: This section may show the supplier the most recent deliveries that were completed, and a supplier can also click into this section and view more detailed delivery history as well as filter the delivery history.

Active Deliveries/Active Drivers 39: This section may show the supplier the active Delivery drivers that they have working currently. Drivers may be required to deliver with their mobile devices on them and the system may track the mobile device to provide real time tracking updates on deliveries and drivers. Supplier may actively get updates on where the drivers are as well as what meals they are carrying for delivery. The system may also use GPS and data analytics to ensure the deliveries are assigned in the most efficient way so driver can carry/make more than one delivery at a time without affecting the condition or quality of the food.

Drivers are mainly selected by the system based on priority and efficiency. First priority would be the restaurant that the order is placed at, they would get the first choice of delivering the order, if they turn it down or don't accept in time the delivery will then be offered to delivery drivers based on a combination of their location and the route of delivery they may already be on. The closer to the restaurant they are the higher chance they have of being selected, while there are other conditions like the route they are taking, if a driver doing a delivery from restaurant A is passing by restaurant B and is on the way to delivery A but the driver will pass restaurant B and delivery A is in the same area as delivery B the delivery driver will get priority on delivery B as it's already in his/her route.

Restaurant Health Tab 40: This tab may show suppliers data on their restaurant that can help suppliers analyze the health of their restaurant such as profitability and user feedback, and an embodiment can be seen at FIG. 7.

Recent Review Good/Bad 41*a*/41*b*: this section may show the supplier recent reviews they have received by end users, and the system may highlight the top recent good 41*a* and bad reviews 41*b* so the supplier can quickly determine things they are getting positive feedback on versus things they are getting negative feedback on.

Increase/Decrease in Sales Volume 42: This section may help suppliers analyze the recent increase or decrease in sales volume, and it can also help the suppliers determine if there are dishes that are performing better than others and are earning the supplier more than others, and it may also break down the total increase or decrease in sales volume (meals sold 43) versus dollar wise sales (total collections).

Recommendations on Busy Times/Days 44*a*/44*b*: As all transaction on the system network are recorded and analyzed the system may be able to supply custom recommendations to suppliers on when their ideal busy times 44*a* are, when their most common slow times 44*b* are and other recommendations such as end user favorites on dishes, or even end user favorite dishes during certain times of the day. This may allow suppliers to become flexible with their meals and staff depending on what works best for them during different shifts of the day. Additionally, it may provide an extra tool for suppliers who are going to utilize Promotions and Advertising through the system as it may increase their success rate knowing their ideal times of day or dishes to promote.

Filter 80 to Toggle Between Set Data Ranges or Time Period

Advertising/Promotion Tab 45: This tab contains all the promotion and advertising options the Supplier may want to utilize or purchase to increase their sales/customer base, and an embodiment can be seen at FIG. 8.

Purchase Spot Light Promotions 46: Spot Lighting as defined earlier is where the system analyzes a supplier data and "Spot Lights" or points out key accolades or weaknesses the supplier may be having. An example of a spot light would be when a supplier of a certain geographical area achieves an accomplishment such as "Most Reviews from end users this week" or "Most five start reviews in XYZ period of time", "Highest rated Sandwich", etc. When a supplier wants to showcase their accolade, they can purchase a spot light promotion 46 and the system may send a push notification to users in the geographical area of the supplier (currently located in the area and users who reside in the area) and the notification may include a message to users encouraging them to eat at your restaurant as you achieved your selected Spot Light Accolade. Additionally, the supplier restaurant page 3*b* may show the accolade badge on the Restaurants page and/or menu item for a set period of time for all end users to see as they are browsing.

Purchase Advertising 47: Purchasing an advertisement may allow the suppliers to select between a banner notification, push notifications, in app pop up notifications or any combination of these. Suppliers may be able to send out some marketing material that can advertise their restaurant, and this may be approved in advance by the system but can include things like special events, or restaurant updates to customer such as grand openings, changing of hours, adding new meals to their menu, new chefs hired, etc.

Purchase/Run a Promotion 48: Suppliers can run a promotion through the system and they can also Purchase a promotion through the system.

Whether the supplier runs a promotion or purchases a promotion both options are paid options and both options have the same delivery method (banner, push notification, text, etc.). Running a promotion is essentially creating a sale or promotional item that end users can obtain by purchasing a meal or specific meal from the supplier. An example of this is Offering a meal option that is normally one meal swipe+ one DCU for the discounted price of one meal swipe only. The supplier can then choose a time frame (set period of time, week/month/day) or a unit quantity (first three-hundred meals purchased) for the promotion to last. This option has a flat fee and upfront cost. Purchasing a promotion 48 is a different, and when a supplier purchases a promotion they essentially advise the system what their costs/expense are for certain dishes, and supplier can enter a target Profit or ROI they would like to achieve from their promotion and based on the system analytics of supplier data (meals sold, times meals are sold, etc.) the system may run promotions that they create for the Supplier at times and prices the system selects, and the system may ensure the promotion price of the item is above the expense cost and provides a profit margin for the supplier, and after the promotion time period expires the costs of the promotion gets finalized based on the ROI and success rate of the promotion. This has a flat fee upfront and an additional charge based on the ROI and success rate of the promotion, and the cost may never be greater than the profit received by the Supplier and may factor into the ROI.

FIG. 9 is an embodiment of a Delivery Driver Page 49, which offers information and enables analytics related to delivery.

Registered Drivers 37: On the delivery diver page 49 there may be a section where the suppliers can view a list of their Registered delivery drivers, and here they can add or remove drivers as well as modify current drivers information.

Delivery History 38: This section may show the supplier the most recent deliveries that were completed, and a supplier can also click into this section and view more detailed delivery history as well as filter the delivery history.

Active Deliveries/Active Drivers 39: This section may show the supplier the active Delivery drivers that they have working currently. Drivers may be required to deliver with their mobile devices on them and the system may track the mobile device to provide real time tracking updates on deliveries and drivers. Supplier may actively get updates on where the drivers are as well as what meals they are carrying for delivery. The system may also use GPS and data analytics to ensure the deliveries are assigned in the most efficient way so driver can carry/make more than one delivery at a time without affecting the condition or quality of the food.

Active Delivery Order 81 show what driver.

Available Drivers 82 Registered Active Drivers not out on Delivery.

The system Market Place 50: This is a tab that connects suppliers with the system Market place where they can browse licensed meals, chefs, kitchen spaces and much more, and an embodiment can be seen at FIG. 10.

Prospective Kitchen/Retail Space 51: This section of the system Market Place may allow a supplier to view available kitchen spaces as well as see data on the spaces such as location, foot traffic, customer bases, and Leasing rates. It may also allow a supplier to submit offers or receive counter offers back from Listing Monetizers.

Request Consulting on Data and Projections 52: This section may allow supplier to purchase consulting time with the system Consultants to review restaurant stats and help put together a full picture of all the stats and information available to a supplier through the system platform, and it may also allow a supplier to get suggestions and recommendations on expanding and future revenue projection.

Staffing market Place Listings 54: This section may allow a supplier to browse listings for staff, and this could be kitchen staff or chefs that are looking for a job.

Meal Licensing Market Place Listings 55: This section may allow supplier access to view the collection of Licensed meals that are available on the Prospective system Platform, and these can be sorted by meal descriptions or by Chefs who created the meals. It may also allow suppliers to view pricing and submit offers/counter offers.

c. End User Interface-Non-Supplier Monetizers i. Account Summary Tab 56: This tab may show non supplier monetizers information about their current sales and future sales, as seen at an embodiment in FIG. 11.

Total Meal Plans Sold 57: Shows the total meal plans the monetizer has sold to date.

Total Active Meal Plans 58: this may show the total number of meal plan users that are currently active, and it may show the stat in both dollar value and a count of end users.

Total Meal plans set to Renew 59: This may show the total amount of active meal plans that are confirmed renewed or set to renew on their next billing cycle Total for Next Payout and Payout date 60: This may show the monetizer how much they are set to earn from their next payout, and it may also show the date of the next payout.

Active Meal Plan users 61: This may be a searchable roster of active meal plan users currently signed up under the monetizer.

ii. the system Market Place 62: This may be a tab that connects the monetizers to the system market place for them to view/modify their listings, as seen in an embodiment in FIG. 12.

Available Kitchen/Retail Spaces for Rent Section 51: this section may show the available kitchen spaces that are listed on the system marketplace, monetizers can choose to filter for all listings, a criterion of listings, or their listings only. Available Spaces on the system may help to have a Profile built for each listing, and the profile may include pictures of the space, square footage, Customer demographics, Location, restrictions, leasing rate, contract terms, revenue splitting.

Prospective Offers 63: Offers on your listings or offers sent on other listings may be viewed through the inbox section of this tab.

Confirmed Offers/Locations 64: Spaces that are confirmed and are actively being leased out may be listed in a separate section of this tab, and a monetizer may be able to view the profiles of the confirmed and active locations they are currently leasing out and can view information such as current revenue splitting profits for the month, time remaining on lease, etc.

d. End User Interface—Chef/Cook i. Account Summary Tab 65: this is a tab where the chef or cook may enter most of the personal information about themselves, in an embodiment seen in FIG. 13.

Profile Pic 11: this is a section where the chef may upload a picture of themselves System Rating 66: the system may rate all chefs that create profiles on the App, ratings may be based on a variety of criteria from employment history to average employment time, feedback from past employers or end user who consumed their cooking and many more. Based on the Chefs rating they may have access to different features within the Prospective system App. For example a chef above a certain rating can have their resume sent to a restaurant that may not be hiring while a lower rated chef may only be able to list their resume on the Prospective system Market place and wait for a restaurant to contact them. All chefs can view supplier listings but some suppliers may restrict lower rated chefs from applying to their listings.

Name 67: this section may list the Chefs Full Name

Employment History 68: This section may allow chefs to enter past employment history, if the chef has been employed from a system supplier through the Prospective system marketplace and their employment history with that supplier may be automatically added to their profile.

Specialties 69: This is a section where chefs can list their special skills that they would like employers to know about.

Accolades/Training/Education 70: This section chefs can list any awards or accolades they have received, and they may also list their training and education background.

Salary Target 71: This section is where chefs may list their target salary and benefit options, and this can be kept private or made public depending on the chef's preference but may become public once a supplier inquires further on a chef.

Geographical Location Targets 72: Chefs can choose to list preferred geographical locations they would like to work in, and they can even restrict the location of their listing. If the chef would like to geographically restrict the suppliers that see their listing, they have the ability to do so.

ii. The System Market Place 73

Map Style Listing 74: The chef's system Market Place tab 73 may include a Map style listing 74 for chefs so they can browse supplier in the area that have active listing looking for chefs, they may also be able to search supplier names if they choose to, in an embodiment seen in FIG. 14.

Available Listings 75: A list of available listings may be on this tab 73 as well. Listings may include the restaurant location, the hours of operation as well as the hours of employment, any requirements, pay ranges, Details on the work environment and job, and whether or not the employment is temporary, permanent, seasonal, etc.

Submit Meal for Licensing 76: Chefs and suppliers can submit meals to the system for Licensing, a chef who would like to submit a meal for licensing approval may do so through the system Market Place Applying For Listing 77: There may be options for chefs to apply for a listing that they qualify for, and once on the Available listings page, chefs may select the listing and if they qualify, they may see the option to apply, if they don't qualify, they may see the factors that are disqualifying them.

Create Listing 78: All registered chefs can be browsed by prospective system Approved employers, and all chefs that qualify to view a listing from suppliers can view listings, but only high rated chefs can create a listing which essentially is done on an individual supplier basis. Chefs can browse a supplier on the system and even if there is no active listing, they can send their resume to the restaurant, and a supplier may get an inbox message with the chef's profile and resume and can evaluate the listing/employment offer. This is only for higher rated chefs as the system does not want to overwhelm a supplier with resumes and prospective employees (chefs) if they are not looking for any.

Inbox 79: This is the section where chefs can view their perspective offers and communications from suppliers.

e. End User Interface-Multi Power Users: This app interface is for users who are Multi power users which are users that are signed up as multiple different roles. An Example is a Chef who also has his own Restaurant, or a Stadium that is signed up as a monetizer but also owns a restaurant inside the stadium thus making them a supplier as well.

i. Linked Accounts: users who are multi power users may be able to switch between their different app profiles but going to the account tab and clicking on their profile picture, if there are additional profiles (monetizer, supplier, chef, end user) they may list and the user may be able to click on another profile of theirs to change the app view.

FIG. 15 can illustrate a computing environment 1510 for assisting with providing a platform for providing meals using digital currency in a network of dining entities. The following may be part of the system.

1520: DINING ENTITY DATABASE, which can store information on all dining entities and individuals.

1522: USER CONNECTIVITY DATABASE, which can stores information on all manner by which devices and individuals may electronically interconnect and communicate.

1530: DINE CURRENCY SERVER, which can process and communicate information on all manner by which dine currency units are determined and analyses conducted in accord with the disclosures herein.

1532: USER COMMUNICATION SERVER, which can process and communicate information on all manner by which individuals and devices can interact.

All of the foregoing can interact and interconnect with databases 1520 and 1522, such as by a network 1515. Network 1515 can represent a network of any logical or physical size such as a broad network such as the Internet, and can represent a small one such as a LAN or hyperlocal network, it being understood that a network enables communication of data from one computing device to another. The network can also be understood as enabling a platform. All of the foregoing can be operatively associated with a computer(s), input device(s) and display(s) 1540, 1542. Computer, input device and display(s) 1540, 1542 (wherein the foregoing can be singular or plural) can contain or be operatively associated with a processor(s), and with memory(ies) and can include software applications. Computer, input device and display 1540, 1542 can comprise a personal computer, a laptop, a tablet, a mobile device such as a smart phone, smart glasses, or a smart watch; it will be appreciated that any device containing, or in operative association with, a processor(s) and a memory(ies) can serve the purpose of computer and input device(s) 1540, 1542. Network 1515 can permit operative communication of the foregoing functionalities with added devices, functionalities and modules. QR Reader 1540, Delivery Driver Communication 1550 and Sensors (Camera/Motion) 1560 can comprise devices, communications and other mechanisms for transmitting, storing and processing information, including providing communications comprising relevant information to Computer 1610 (which itself can comprise multiple devices/networks), and vice versa.

FIG. 16 illustrates a computer system 1600 for implementing a system and method according to various non-limiting embodiments. Computer 1610 may contain or be operatively associated with a processor(s), and with memory(ies) including storage device 1620 and memory 1630, which also may include software applications. An input device 1640, such as a keyboard, can be used to enter inputs into, and exercises control of, computer 1610 and components associated therewith. There may be multiple computers operatively associated with computer 1610 and its associated components. There may be an output device 1650 such as a monitor screen, computer-to-computer communication device (e.g., modem), and/or a printer. In an embodiment, non-transitory computer readable media or memory 1630 are provided. The computer-readable media or memory can tangibly embody a program of instructions executable by the computer system to carry out operations as described herein.

The present disclosure may also be understood as a method for providing meals in a network of dining entities, executing on one or more computers (e.g., as discussed in relation to FIG. 16) such as detailed in the example flowchart 1700 in FIG. 17. The flowchart 1700 begins at block 1710, where the computer of a given user (e.g., the user device) provides a first instance of the application platform to the given user. As used herein, an instance of an application platform refers to a locally run copy or executable on the user device for interacting with the meal platform described herein/Accordingly, two users using two separate devices may each access the same platform using two separate instances of the application platform. Each of the users may be provided with different subsets of user interfaces (when different user types access the platform) or the same subsets of user interfaces populated with different data (e.g., data related to the individual users, where those users have eaten, account balances specific to the individual users, etc.).

At block 1720, the user device identifies a user type for the given user of the application platform described herein. In various embodiments, the given user may identify to the user device that the user is one of a supplier-type user (e.g., a restaurant manager), a consumer-type user (e.g., a diner), or a vendor-type user (e.g., a food wholesaler, a chef, a front-of-house worker, a delivery driver, or other entity selling goods or services to a restaurant). In various embodiments, the given user may identify as two or more of the user types of the group of available user types concurrently, and receive the tabs/screens in the instance of the application platform concurrently with one another (e.g., as additional selectable tab options). In various embodiments, the user type is identified via a login/password pair and associated account details that specify what type to identify the given user as.

At block 1730, the user device provides a first subset of user interfaces in the first instance when the user is identified as a supplier-type user. In various embodiments, the first subset of user interfaces is provided for interacting with other users the application platform as recipient users, including the consumer-type user and the vendor-type user. For example, a supplier-type user may represent a restaurant that feeds consumer-type users and hires vendor-type users. In another example, the supplier-type user is a first restaurant and the vendor-type user is a second restaurant, that the first restaurant procures a recipe from, reallocates food inventory from, or ingests trend data from.

In various embodiments, the first subset of user interfaces include: an account summary tab including restaurant stats and earnings data; a restaurant health tab including profitability and user feedback data; an advertising/promotion tab including promotion and advertising options; a delivery driver page including information and analytics related to delivery from the given user; and a marketplace tab including controls to browse licensed meals, chefs, and kitchen spaces available to the given user.

At block 1740, the user device provides a second subset of user interfaces in the first instance when the user is identified as a consumer-type user. For example, the consumer-type user may represent a restaurant goer who has purchased a meal plan through the application platform and seeks to identify or research restaurants, leave reviews for restaurants, or order food from restaurants as supplier-type users. Some of these interactions may be performed with currency, with meal tickets credited in the platform, or with non-monetary transactions, which the application tracks for the user. In various embodiments, the second subset of user interfaces prohibits or blocks interactions with other consumer-type users or vendor-type users. However, the supplier-type users may pass-through interaction data from the consumer and vendor-type users (e.g., via reviews, chef statements, etc.) in a restaurant interface.

In various embodiments, second subset of user interfaces include: an account tab including a profile picture of the given user, a total amount of meal remaining in a meal plan and a total amount of currency units remaining in an associated account, discounts or promotions available to the user, active orders, and a summary of past meals consumed by the given user; a payment tab including QR Code and a diner Number associated with the given user, an expiration date for a meal plan associated with the given user, and a purchase option to add additional meals or currency units to the meal plan; a restaurants tab including controls for searching for restaurants participating the in meal plan; and a health tab including a calculation of calories consumed by the given user through a specified time period, health/fitness data associated with the given user, and diet goals or advanced meal planning data for the given user.

At block 1750, the user device provides a third subset of user interfaces in the first instance when the user is identified as a vendor-type user. For example, vendor-type users can include grocers or food stock supply companies with inventory; restaurants with excess food stock (e.g., when the supplier-type user is a foodbank or charity); chefs, bartenders, front-of-house staff (e.g., servers, bussers), delivery personnel selling labor; recipe holders seeking to license recipes to restaurants; consultants or other restaurants providing trend data; advertising firms; or the like who seek to interact with the supplier-type users. Some of these interactions may be performed with currency, with meal tickets credited in the platform, or with non-monetary transactions, which the application tracks for the user. In various embodiments, the third subset of user interfaces prohibits or blocks interactions with other vendor-type users or consumer-type users.

In various embodiments, third subset of user interfaces include: an account summary tab that includes information about current and future sales or enter personal information for supplier-type users to view; and a marketplace tab view/modify listings for offering actions to or accepting actions offered by the supplier-type users.

At block 1760, in response to receiving a command from the given user for performing an action in the application platform, the user device provides an output, via the application platform, of the action to at least one user of the recipient users via a second instance of the application platform.

For example, the consumer user may interact with a supplier user (a restaurant) as a recipient user to obtain a meal from. This interaction may include a transfer of funds or a debiting of a meal ticket from a meal plan, or may be a non-monetary transaction between the two users (e.g., as part of a promotion). In another example, when the consumer performs the action, the user leaves a complaint, a review, or a rating for the restaurant; however, the platform may restrict the user from leaving certain reviews/ratings based on previously observed behavior in the first instance of the application platform. For example, the applicant platform may allow the user to share ratings or reviews in response to confirming that an predefined earlier action occurred within a given time window of the action of sharing the ratings or reviews, so that a consumer cannot review the food of the restaurant with confirmed meal being received from the associated restaurant within the given time window, or cannot comment on the cleanliness of the restaurant without having been located in or within a predefined distance of the restaurant within the given time window. Accordingly, the platform may prevent or reduce the incidence of false reviews or brigading of a restaurant by managing (and tracking) several related activities across different user types.

In another example, a restaurant user (e.g., a supplier) may post requests for space, job openings, requests for trend data, or the like that vendors can respond to, or may browse postings by the vendors for space, job requests, recipe licensing opportunities, trend data availability or the like. In another example, a restaurant user may post advertisements to consumers, curate restaurant information available to consumers searching for restaurants, or conduct transactions (e.g., promotions or sales) with consumers.

While various details have been set forth in the foregoing description, it will be appreciated that the various aspects may be practiced without these specific details. For example, for conciseness and clarity selected aspects may have been shown in block diagram form rather than in detail. Some portions of the detailed descriptions provided herein may be presented in terms of instructions that operate on data that is stored in a computer memory. Such descriptions and representations are used by those skilled in the art to describe and convey the substance of their work to others skilled in the art.

Reference to "one aspect," "an aspect," "one embodiment," or "an embodiment" means that a particular method, feature, structure, or characteristic described in connection with the aspect is included in at least one aspect. Thus, appearances of the phrases "in one aspect," "in an aspect," "in one embodiment," or "in an embodiment" in various places throughout the specification are not necessarily all referring to the same aspect. Furthermore, the particular methods, features, structures or characteristics may be combined in any suitable manner in one or more aspects.

Although various embodiments have been described herein, many modifications, variations, substitutions, changes, and equivalents to those embodiments may be implemented and will occur to those skilled in the art. Also, where materials are disclosed for certain components, other materials may be used. It is therefore to be understood that the foregoing description and the claims are intended to cover all such modifications and variations as falling within the scope of the disclosed embodiments.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

One skilled in the art will recognize that the herein described methods, systems, components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedia components. Likewise, any two components so associated can also be viewed as being "in operative communication", "operably connected," or the like to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the claims, are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present.

With respect to the claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other adjectives are generally not intended to exclude such variants, unless context dictates otherwise.

Although various embodiments have been described herein, many modifications, variations, substitutions, changes, and equivalents to those embodiments may be implemented and will occur to those skilled in the art. Also, where materials are disclosed for certain components, other materials may be used. It is therefore to be understood that the foregoing description and the claims are intended to cover all such modifications and variations as falling within the scope of the disclosed embodiments. The claims are intended to cover all such modifications and variations.

In summary, numerous benefits have been described which result from employing the concepts described herein. The foregoing description of the one or more embodiments has been presented for purposes of illustration and description. It is not intended to be exhaustive or limiting to the precise form disclosed. Modifications or variations are possible in light of the above teachings. The one or more embodiments were chosen and described in order to illustrate principles and practical application to thereby enable one of ordinary skill in the art to utilize the various embodiments and with various modifications as are suited to the particular use contemplated.

What is claimed is:

1. A method, comprising: identifying a user type for a given user in an application platform for a plurality of users, selected from the group comprising: a supplier-type user; a consumer-type user; and a vendor-type user; identifying other users in the application platform as recipient users for the given user based on the user type for the given user, wherein: the recipient users include the other users of the consumer-type user and the vendor-type user when the given user is identified as the supplier-type user; the recipient users include the other users of the supplier-type user and exclude the other users of the vendor-type user when the given user is identified as the consumer-type user; the recipient users include the supplier-type user and exclude the consumer-type user when the given user is identified as the vendor-type user; providing in a first instance of the application platform one of a first subset of user interfaces, a second subset of user interfaces, and a third subset of user interfaces to the given user based on the identified user type, wherein: when the given user is identified as the supplier-type user, the first subset of user interfaces is provided for interacting with the recipient users; when the given user is identified as the consumer-type user, the second subset of user interfaces, different from the first subset of user interfaces, is provided for interacting with the recipient users; when the given user is identified as the vendor-type user, the third subset of user interfaces, different from the first subset and the second subset of user interfaces, is provided for interacting with the recipient users; and in response to receiving a command from the given user for performing an action in the application platform, providing an output of the action to at least one user of the recipient users via a second instance of the application platform.

2. The method of claim 1, wherein the vendor-type user is selected from the group comprising:
   a chef;
   a delivery driver;
   a front house food service worker; and
   the supplier-type user is a restaurant.

3. The method of claim 1, wherein the vendor-type user is a restaurant and the supplier-type user is a food bank or charity.

4. The method of claim 1, wherein the supplier-type user is a first restaurant and the vendor-type user is a second restaurant, wherein the performing the action provides a recipe from the second restaurant to the first restaurant, reallocates food inventory from the second restaurant to the first restaurant, or shares trend data from the second restaurant to the first restaurant.

5. The method of claim 1, wherein the performing the action shares ratings or reviews to a page associated with the recipient users identified for the given user, wherein the application platform permits the given user to share the ratings or the reviews in response to an earlier action, that occurred within a given time window of the action of sharing the ratings or reviews, conducted between the given user and the recipient users for whom the ratings or reviews are based on time of interaction between the recipient users and the given user.

6. The method of claim 1, wherein the performing the action credits a non-monetary transaction between the given user and a second user of the recipient users identified for the given user.

7. The method of claim 1, further comprising:
   identifying a concurrent second user type to the user type for the given user in the application platform, selected from the group comprising:
      the supplier-type user;
      the consumer-type user; and
      the vendor-type user; and
   providing in the first instance of the application platform a second one of the first subset of user interfaces, the second subset of user interfaces, and the third subset of user interfaces to the given user based on the identified concurrent second user type, wherein the second one is provided concurrently to the one of the first subset of user interfaces, the second subset of user interfaces, and the third subset of user interfaces.

8. The method of claim 1, wherein the first subset of user interfaces include:
   an account summary tab including restaurant stats and earnings data;
   a restaurant health tab including profitability and user feedback data;
   an advertising/promotion tab including promotion and advertising options;
   a delivery driver page including information and analytics related to delivery from the given user; and
   a marketplace tab including controls to browse licensed meals, chefs, and kitchen spaces available to the given user.

9. The method of claim 1, wherein the second subset of user interfaces include:
   an account tab including a profile picture of the given user, a total amount of meal remaining in a meal plan and a total amount of currency units remaining in an associated account, discounts or promotions available to the given user, active orders, and a summary of past meals consumed by the given user;

a payment tab including QR Code and a diner Number associated with the given user, an expiration date for a meal plan associated with the given user, and a purchase option to add additional meals or currency units to the meal plan;

a restaurants tab including controls for searching for restaurants participating in the meal plan; and a health tab including a calculation of calories consumed by the given user through a specified time period, health/fitness data associated with the given user, and diet goals or advanced meal planning data for the given user.

10. The method of claim 1, wherein the third subset of user interfaces include:

an account summary tab that includes information about current and future sales or enter personal information for supplier-type users to view; and a marketplace tab view/modify listings for offering actions to or accepting actions offered by the supplier-type users.

11. A system, comprising: a processor; and a memory including instructions that when executed by the processor enable performance of operations including: identifying a user type for a given user in an application platform for a plurality of users, selected from the group comprising: a supplier-type user; a consumer-type user; and a vendor-type user; identifying other users in the application platform as recipient users for the given user based on the user type for the given user, wherein: the recipient users include the other users of the consumer-type user and the vendor-type user when the given user is identified as the supplier-type user; the recipient users include the other users of the supplier-type user and exclude the other users of the vendor-type user when the given user is identified as the consumer-type user; the recipient users include the supplier-type user and exclude the consumer-type user when the given user is identified as the vendor-type user; providing in a first instance of the application platform one of a first subset of user interfaces, a second subset of user interfaces, and a third subset of user interfaces to the given user based on the identified user type, wherein: when the given user is identified as the supplier-type user, the first subset of user interfaces is provided for interacting with the recipient users; when the given user is identified as the consumer-type user, the second subset of user interfaces, different from the first subset of user interfaces, is provided for interacting with the recipient users; when the given user is identified as the vendor-type user, the third subset of user interfaces, different from the first subset and the second subset of user interfaces, is provided for interacting with the recipient users; and in response to receiving a command from the given user for performing an action in the application platform, providing an output of the action to at least one user of the recipient users via a second instance of the application platform.

12. The system of claim 11, wherein the vendor-type user is selected from the group comprising:

a chef;

a delivery driver;

a front house food service worker; and the supplier-type user is a restaurant.

13. The system of claim 11, wherein the vendor-type user is a restaurant and the supplier-type user is a food bank or charity.

14. The system of claim 11, wherein the supplier-type user is a first restaurant and the vendor-type user is a second restaurant, wherein the performing the action provides a recipe from the second restaurant to the first restaurant, reallocates food inventory from the second restaurant to the first restaurant, or shares trend data from the second restaurant to the first restaurant.

15. The system of claim 11, wherein the performing the action shares ratings or reviews to a page associated with the recipient users identified for the given user, wherein the application platform permits the given user to share the ratings or the reviews in response to an earlier action, that occurred within a given time window of the action of sharing the ratings or reviews, conducted between the given user and the recipient users for whom the ratings or reviews are based on time of interaction between the recipient users and the given user.

16. The system of claim 11, wherein the performing the action credits a non-monetary transaction between the given user and a second user of the recipient users identified for the given user.

17. The system of claim 11, further comprising:

identifying a concurrent second user type to the user type for the given user in the application platform, selected from the group comprising:

the supplier-type user;

the consumer-type user; and the vendor-type user; and providing in the first instance of the application platform a second one of the first subset of user interfaces, the second subset of user interfaces, and the third subset of user interfaces to the given user based on the identified concurrent second user type, wherein the second one is provided concurrently to the one of the first subset of user interfaces, the second subset of user interfaces, and the third subset of user interfaces.

18. The system of claim 11, wherein the first subset of user interfaces include:

an account summary tab including restaurant stats and earnings data;

a restaurant health tab including profitability and user feedback data;

an advertising/promotion tab including promotion and advertising options;

a delivery driver page including information and analytics related to delivery from the given user; and a marketplace tab including controls to browse licensed meals, chefs, and kitchen spaces available to the given user.

19. The system of claim 11, wherein the second subset of user interfaces include:

an account tab including a profile picture of the given user, a total amount of meal remaining in a meal plan and a total amount of currency units remaining in an associated account, discounts or promotions available to the given user, active orders, and a summary of past meals consumed by the given user;

a payment tab including QR Code and a diner Number associated with the given user, an expiration date for a meal plan associated with the given user, and a purchase option to add additional meals or currency units to the meal plan;

a restaurants tab including controls for searching for restaurants participating in the meal plan; and a health tab including a calculation of calories consumed by the given user through a specified time period, health/fitness data associated with the given user, and diet goals or advanced meal planning data for the given user.

20. The system of claim 11, wherein the third subset of user interfaces include:
   an account summary tab that includes information about current and future sales or enter personal information for supplier-type users to view; and
a marketplace tab view/modify listings for offering actions to or accepting actions offered by the supplier-type users.

\* \* \* \* \*